United States Patent
Khokhlov et al.

(10) Patent No.: US 11,288,956 B2
(45) Date of Patent: Mar. 29, 2022

(54) METHODS OF DETERMINING USER-CENTRIC TRAFFIC ESTIMATION ERROR PARAMETER ASSOCIATED WITH ESTIMATED ROAD TRAFFIC CONDITIONS

(71) Applicant: YANDEX EUROPE AG, Lucerne (CH)

(72) Inventors: Mikhail Aleksandrovich Khokhlov, Dolgoprudniy (RU); Philipp Gennadievich Sinitsyn, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 355 days.

(21) Appl. No.: 15/861,197

(22) Filed: Jan. 3, 2018

(65) Prior Publication Data

US 2018/0286221 A1    Oct. 4, 2018

(30) Foreign Application Priority Data

Apr. 4, 2017    (RU) ............................ RU2017111279

(51) Int. Cl.
*G08G 1/01* (2006.01)
*G01C 21/20* (2006.01)
(Continued)

(52) U.S. Cl.
CPC ............ *G08G 1/0104* (2013.01); *G01C 21/20* (2013.01); *G01C 21/3492* (2013.01);
(Continued)

(58) Field of Classification Search
CPC .. G08G 1/0104; G08G 1/0112; G08G 1/0129; G08G 1/0141; G08G 1/096716;
(Continued)

(56) References Cited

U.S. PATENT DOCUMENTS

| 7,392,133 B2 * | 6/2008 | Maruyama | ......... G01C 21/3626 340/995.13 |
| 2002/0000920 A1 * | 1/2002 | Kavner | .................. G08G 1/164 340/905 |

(Continued)

FOREIGN PATENT DOCUMENTS

| CN | 101783075 A | 7/2010 |
| CN | 102097007 A | 6/2011 |

(Continued)

OTHER PUBLICATIONS

Search Report with regard to the counterpart RU Application No. 2017111279 completed Jun. 6, 2018.

(Continued)

*Primary Examiner* — Paula L Schneider
(74) *Attorney, Agent, or Firm* — BCF LLP

(57) ABSTRACT

A method of determining a user-centric traffic estimation error parameter associated with an estimated road traffic condition that is electronically provided to a user of a device. the method comprises: at a first moment in time, acquiring an estimated travel time for a road segment, the estimated travel time having been computed for the first moment in time; responsive to the device approaching the road segment, displaying an application-generated estimated travel time for the road segment, the application-generated estimated travel time being based on a most recently acquired estimated travel time from the server; responsive to the device departing from the road segment, determining an actual travel time for the road segment; computing the user-centric traffic estimation error parameter based on the application-generated estimated travel time and the actual travel time; and transmitting the user-centric traffic estimation error parameter to the server for adjusting a traffic prediction algorithm.

10 Claims, 11 Drawing Sheets

(51) Int. Cl.
*G01C 21/34* (2006.01)
*G08G 1/0967* (2006.01)
*G08G 1/0968* (2006.01)
*G01C 21/36* (2006.01)

(52) U.S. Cl.
CPC ......... *G08G 1/0112* (2013.01); *G08G 1/0129* (2013.01); *G08G 1/0141* (2013.01); *G08G 1/096716* (2013.01); *G08G 1/096741* (2013.01); *G08G 1/096775* (2013.01); *G08G 1/096811* (2013.01); *G08G 1/096838* (2013.01); *G08G 1/096844* (2013.01); *G01C 21/3415* (2013.01); *G01C 21/3694* (2013.01)

(58) Field of Classification Search
CPC ....... G08G 1/096741; G08G 1/096775; G08G 1/096811; G08G 1/096838; G08G 1/096844; G08G 1/00; G01C 21/20; G01C 21/3492; G01C 21/3415; G01C 21/3694; G01C 21/00; G06F 15/00
USPC ........................................................ 701/423
See application file for complete search history.

(56) References Cited

U.S. PATENT DOCUMENTS

| | | | | |
|---|---|---|---|---|
| 2007/0293958 | A1* | 12/2007 | Stehle | G06Q 10/04 700/30 |
| 2007/0294023 | A1 | 12/2007 | Arcot et al. | |
| 2009/0287405 | A1* | 11/2009 | Liu | G01C 21/20 701/119 |
| 2012/0290202 | A1 | 11/2012 | Gueziec | |
| 2012/0296559 | A1 | 11/2012 | Gueziec et al. | |
| 2015/0269841 | A1 | 9/2015 | Makowitz et al. | |
| 2017/0284824 | A1* | 10/2017 | Korzunov | G01C 21/3697 |
| 2017/0314933 | A1* | 11/2017 | Denaro | G01C 21/32 |
| 2018/0156619 | A1* | 6/2018 | Denaro | B60W 30/18009 |

FOREIGN PATENT DOCUMENTS

| | | |
|---|---|---|
| CN | 102169630 A | 8/2011 |
| CN | 102280029 A | 12/2011 |
| CN | 103996289 A | 8/2014 |
| CN | 104318772 A | 1/2015 |
| DE | 102004049936 A1 | 4/2006 |
| EP | 1174842 A1 | 1/2002 |
| KR | 1020140146917 A | 12/2014 |
| RU | 2601133 C2 | 10/2016 |

OTHER PUBLICATIONS

Machine Translation of CN 103996289 retrieved on Mar. 30, 2017.
English Abstract of KR1020140146917 retrieved on Espacenet on Jul. 4, 2017.
English Abstract of CN101783075 retrieved on Espacenet on Jul. 4, 2017.
English Abstract of CN102169630 retrieved on Espacenet on Jul. 4, 2017.
English Abstract of CN104318772 retrieved on Espacenet on Jul. 4, 2017.
English Abstract of CN 102097007 retrieved on Espacenet on Jul. 4, 2017.
English Abstract of DE102004049936 retrieved on Espacenet on Jul. 4, 2017.
English Abstract of EP1174842 retrieved on Espacenet on Jul. 4, 2017.
English Abstract of CN101783075 retrieved on Jul. 4, 2017.
Machine Translation of CN102280029 retrieved on Mar. 30, 2017.

* cited by examiner

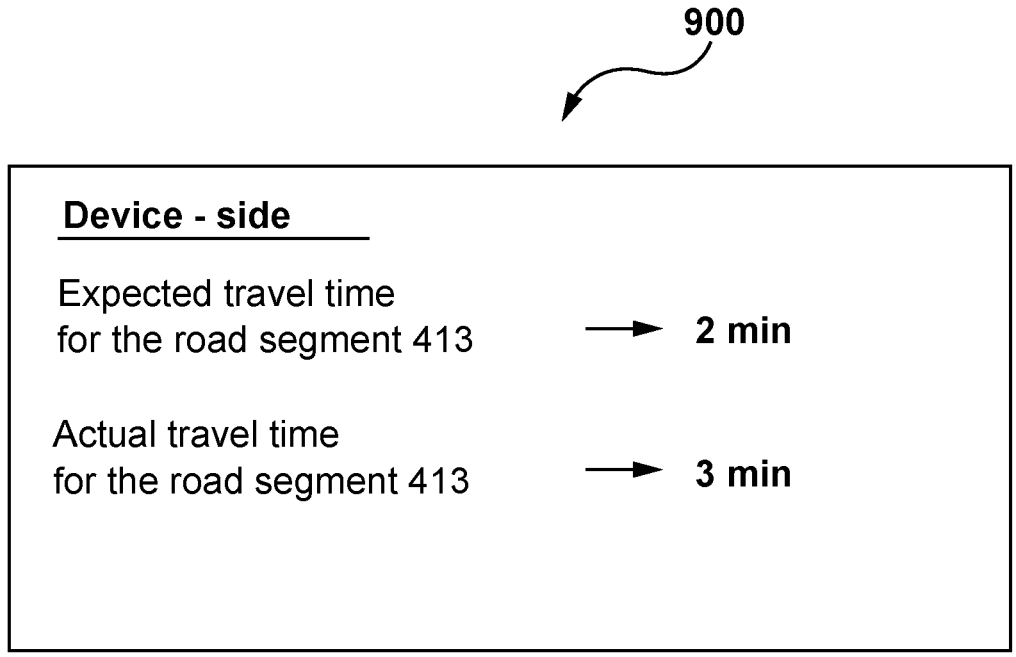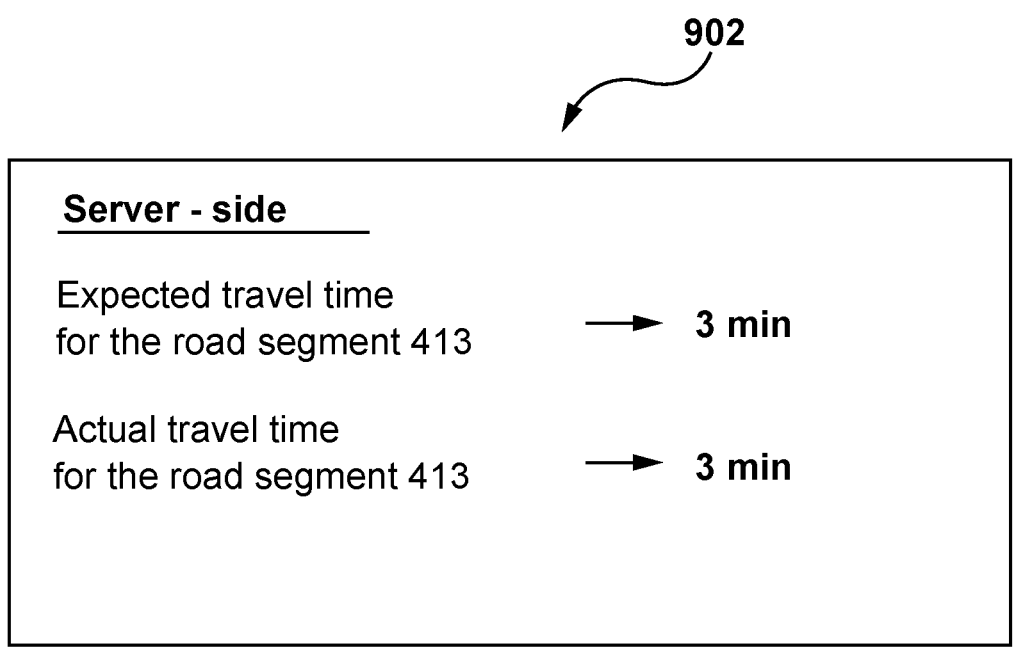
FIG. 9

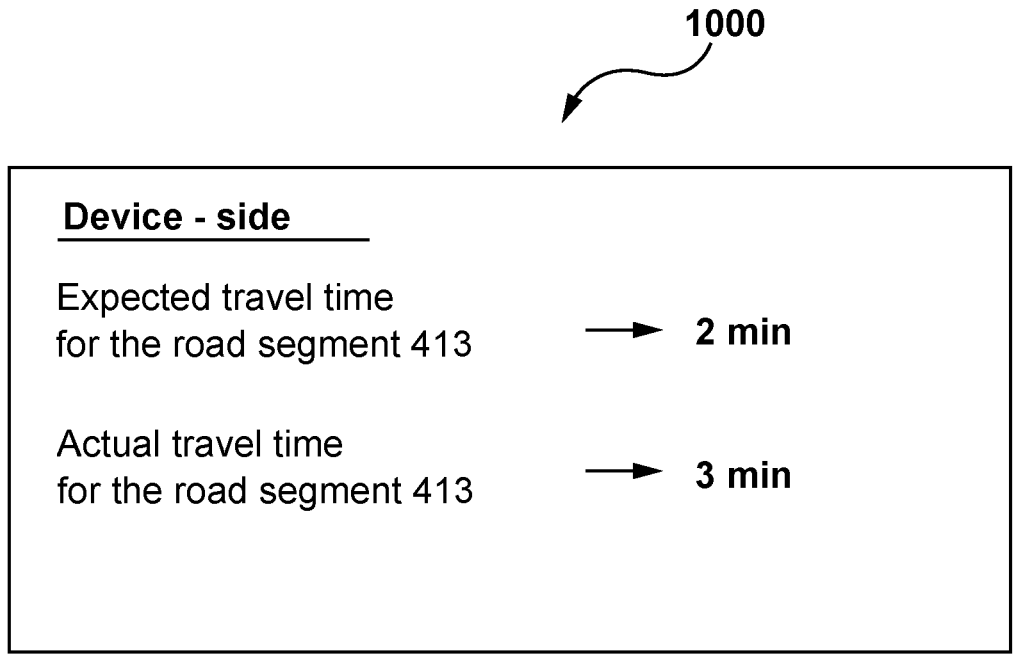
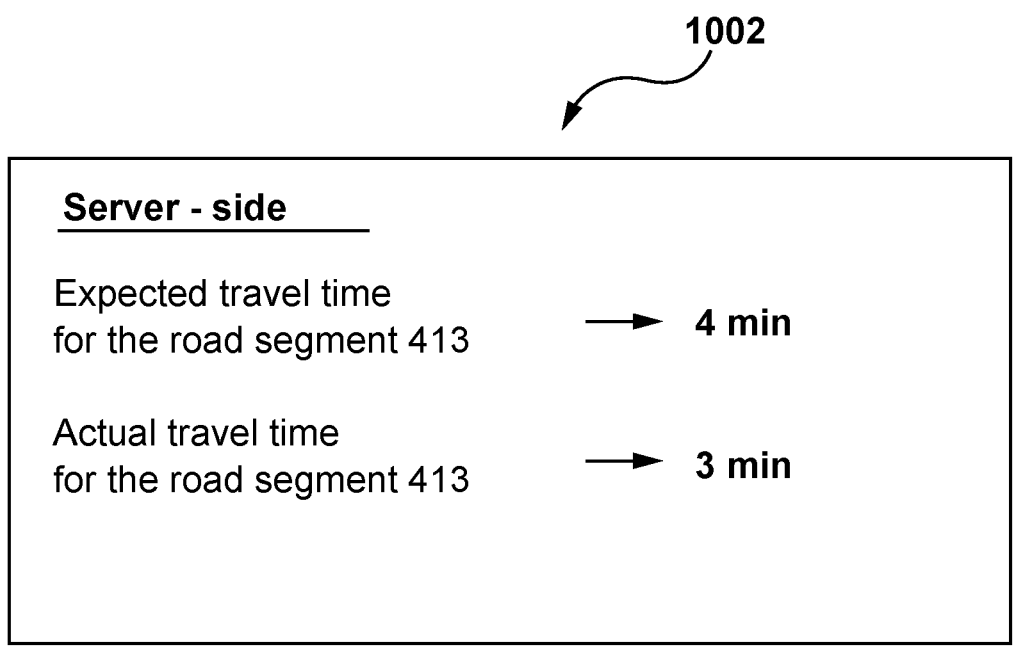
FIG. 10

METHODS OF DETERMINING USER-CENTRIC TRAFFIC ESTIMATION ERROR PARAMETER ASSOCIATED WITH ESTIMATED ROAD TRAFFIC CONDITIONS

CROSS-REFERENCE

The present application claims priority to Russian Patent Application No. 2017111279, entitled "Methods Of Determining User-Centric Traffic Estimation Error Parameter Associated With Estimated Road Traffic Conditions," filed on Apr. 4, 2017, the entirety of which is incorporated herein by reference.

FIELD OF TECHNOLOGY

The present technology relates to estimation of road traffic conditions and, more specifically, to methods and systems for determining user-centric parameters for adjusting traffic prediction algorithms.

BACKGROUND

Mapping and/or navigation methods and systems generally provide maps and routes between a start position and a destination position to electronic devices which may be associated with vehicles. Electronic devices may be smart phones, tablets or vehicle navigational devices. Some of these known methods and systems may estimate a time necessary to travel.

The electronic device is usually provided with navigational information based on a user request therefor from an online service. Upon such request, a server implementing the online service provides navigational information which aids the user to determine a given route that (s)he may want to take for arriving to destination. Additionally, road traffic conditions associated with the possible routes may also be provided to the user.

The server may update the navigational information while the user is travelling. However, these updates are not always acquired by the electronic device due to network issues (as an example) and, therefore, the user may not be aware that the navigational information has been updated and that new road traffic conditions have been estimated by the server. On the other hand, the server may not be aware of the non-acquisition, by the electronic device, of the newly updated navigational information which results in a disparity between the road traffic expected by the user and the road traffic currently estimated by the server.

As a result, when adjusting the online service for providing more accurate navigational information, the server will adjust the online service based on the server-side history of the road traffic predictions. Indeed, the server will not take into account the user dissatisfaction with the road traffic conditions that were provided thereto, since the server is not aware that the user was not provided with the updated road traffic conditions.

For the foregoing reasons, there is a need for methods and systems for determining user dissatisfaction with the road traffic conditions that were provided thereto.

SUMMARY

Embodiments of the present technology have been developed based on developers' appreciation that while the server updates road traffic conditions, the user is not always aware of which updates are actually provided to the user of an electronic device. Embodiments of the present technology have been developed based on developers' appreciation of at least one technical problem associated with the prior art solutions. Therefore, developers have devised method and systems for determining a user-centric traffic prediction error parameter for adjusting traffic prediction algorithms.

In accordance with a first broad aspect of the present technology, there is provided a method of determining a user-centric traffic estimation error parameter associated with an estimated road traffic condition that is electronically provided to a user of an electronic device using a navigational application executed on the electronic device. The method is executed on the electronic device. The method comprises at a first moment in time, acquiring, by the electronic device from a server, an estimated travel time for a road segment. The server executes a traffic prediction algorithm. The estimated travel time has been computed by the traffic prediction algorithm for the first moment in time. The estimated travel time is indicative of the estimated road traffic condition of the road segment during the first moment in time. The method comprises, responsive to the electronic device approaching the road segment, displaying, by the electronic device, an application-generated road traffic condition for the road segment, the application-generated road traffic condition is based on a most recently acquired estimated travel time from the server. The application-generated road traffic condition is representative of an expected travel time for the road segment by the user as the user enters the road segment. The method comprises, responsive to the electronic device departing from the road segment, determining, by the electronic device, an actual travel time for the road segment. The actual travel time is indicative of an actual road traffic condition of the road segment experienced by the user as the user travelled the road segment. The method comprises determining, by the electronic device, device-side intelligence of the electronic device which is indicative of the expected travel time by the user upon the electronic device approaching the road segment and of the actual travel time. The method comprises transmitting, by the electronic device, to the server for adjusting the traffic prediction algorithm based on the user-centric traffic estimation error parameter, one of the user-centric traffic estimation error parameter, where the user-centric traffic estimation error parameter is computed by the electronic device based on the device-side intelligence, and the device-side intelligence for computing the user-centric traffic estimation error parameter.

In some implementations of the method, the method further comprises determining, by the electronic device, that the electronic device is approaching the road segment.

In some implementations of the method, the traffic prediction algorithm is configured by the server to compute updated estimated travel times according to a frequency of computation.

In some implementations of the method, the frequency of computation varies depending on a period of a day.

In some implementations of the method, the most recently acquired estimated travel time from the server is the estimated travel time that has been computed by the traffic prediction algorithm for the first moment in time.

In some implementations of the method, the electronic device approaches the road segment at a second moment in time. The second moment in time is later in time than the first moment in time, and wherein an interval between the second moment in time and the first moment in time is superior to the frequency of computation.

In some implementations of the method, the most recently acquired estimated travel time is an outdated estimated travel time at the second moment in time.

In some implementations of the method, the electronic device departs from the road segment at a third moment in time. The third moment in time is later in time than the second moment in time, and wherein the most recently acquired estimated travel time is an outdated estimated travel time at the third moment in time.

In some implementations of the method, the method further comprises determining, by the electronic device, that the electronic device is departing from the road segment.

In accordance with a second broad aspect of the present technology, there is provided a server for adjusting a traffic prediction algorithm based on a user-centric traffic estimation error parameter associated with an estimated road traffic condition. The server executes the traffic prediction algorithm. The server is communicatively coupled to an electronic device. The electronic device executes a navigational application for electronically providing to a user of the electronic device the estimated road traffic condition. The server is configured to acquire, from the electronic device, initial navigational parameters that are indicative of a request from a user for the estimated road traffic condition. The server is configured to, at a first moment in time, compute an estimated travel time for a road segment for the first moment in time using the traffic prediction algorithm based on the initial navigational parameters. The estimated travel time is indicative of the estimated road traffic condition of the road segment during the first moment in time. The server is configured to, at a first moment in time, transmit the estimated travel time for the road segment for the first moment in time to the navigational application of the electronic device. The server is configured to compute an updated estimated travel time for the road segment for another moment in time using the traffic prediction algorithm. The another moment in time is later in time than the first moment in time. The updated estimated travel time is indicative of an updated estimated road traffic condition of the road segment during the another moment in time. The server is configured to send the updated estimated travel time for the road segment for the another moment in time to the navigational application of the electronic device. The updated estimated travel time for the road segment for the another moment in time is non-acquired by the electronic device. The server is unaware of non-acquisition by the electronic device of the updated estimated travel time for the road segment for the another moment in time. The server is configured to at a third moment in time, where the third moment in time is later in time than the another moment in time, acquire one of device-side intelligence of the electronic device from the electronic device for computing the user-centric traffic estimation error parameter and the user-centric traffic estimation error parameter that is computed by the electronic device based on the device-side intelligence. The device-side intelligence is indicative of an expected travel time by the user upon the electronic device approaching the road segment and of the actual travel time. The expected travel time is based on a most recently acquired estimated travel time by the electronic device. The expected travel time is represented by an application-generated road traffic condition for the road segment provided to the user as the user entered the road segment. The actual travel time is indicative of an actual road traffic condition for the road segment experienced by the user as the user travelled the road segment. The server is further configured to adjust the road traffic prediction algorithm based on the user-centric traffic estimation error parameter.

In some implementations of the server, the server is further configured determine server-side intelligence that is indicative of the updated estimated travel time for the road segment for another moment in time and of the actual travel time. The updated estimated travel time is a most recently sent estimated travel time by the server. The device-side intelligence is different from the server-side intelligence.

In some implementations of the server, the server is further configured to, at the third moment in time, acquire the device-side intelligence of the electronic device from the electronic device for computing the user-centric traffic estimation error parameter. The server is further configured to determine server-side intelligence that is indicative of the updated estimated travel time for the road segment for another moment in time and of the actual travel time. The updated estimated travel time is a most recently sent estimated travel time by the server. The server is further configured to determine if the device-side intelligence is different from the server-side intelligence. The server is further configured to, in response to determining that the device-side intelligence is different from the server-side intelligence, determine that the updated estimated travel time for the road segment for the another moment in time has been non-acquired by the electronic device.

In some implementations of the server, the traffic prediction algorithm is configured by the server to compute updated estimated travel times according to a frequency of computation.

In some implementations of the server, the frequency of computation varies depending on a period of a day.

In accordance with a third broad aspect of the present technology, there is provided an electronic device for determining a device-side intelligence associated with an estimated road traffic condition that is electronically provided to a user of the electronic device using a navigational application executed on the electronic device. The electronic device is communicatively coupled to a server. The electronic device is configured to, at a first moment in time, acquire from the server, an estimated travel time for a road segment. The server executes a traffic prediction algorithm. The estimated travel time has been computed by the traffic prediction algorithm for the first moment in time. The estimated travel time is indicative of the estimated road traffic condition of the road segment during the first moment in time. The electronic device is configured to, responsive to the electronic device approaching the road segment, display an application-generated road traffic condition for the road segment. The application-generated road traffic condition is based on a most recently acquired estimated travel time from the server. The application-generated road traffic condition is representative of an expected travel time for the road segment by the user as the user enters the road segment. The electronic device is configured to, responsive to the electronic device departing from the road segment, determine an actual travel time for the road segment. The actual travel time is indicative of an actual road traffic condition of the road segment experienced by the user as the user travelled the road segment. The electronic device is configured to determine the device-side intelligence of the electronic device that is indicative of the expected travel time by the user upon the electronic device approaching the road segment and of the actual travel time experienced by the user. The electronic device is configured to transmit to the server for adjusting the traffic prediction algorithm based on a user-centric traffic estimation error parameter, one of the user-centric traffic estimation error parameter, where the user-centric traffic estimation error parameter is computed by the electronic device based on the device-side intelligence, and the device-side intelligence for computing the user-centric traffic estimation error parameter.

In some implementations of the electronic device, the electronic device is further configured to determine that the electronic device is approaching the road segment.

In some implementations of the electronic device, the electronic device is further configured to determine that the electronic device is departing from the road segment.

In some implementations of the electronic device, the most recently acquired estimated travel time from the server is the estimated travel time having been computed by the traffic prediction algorithm for the first moment in time.

In some implementations of the electronic device, the electronic device approaches the road segment at a second moment in time and the most recently acquired estimated travel time is an outdated estimated travel time at the second moment in time.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/ sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/ sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 9 is a visual representation of a device-side intelligence of the electronic device of FIG. 2 and of a server-side intelligence of the server of FIG. 2 according to a first scenario;

FIG. 10 is a visual representation of a device-side intelligence of the electronic device of FIG. 2 and of a server-side intelligence of the server of FIG. 2 according to a second scenario.

DETAILED DESCRIPTION

Figure 1:
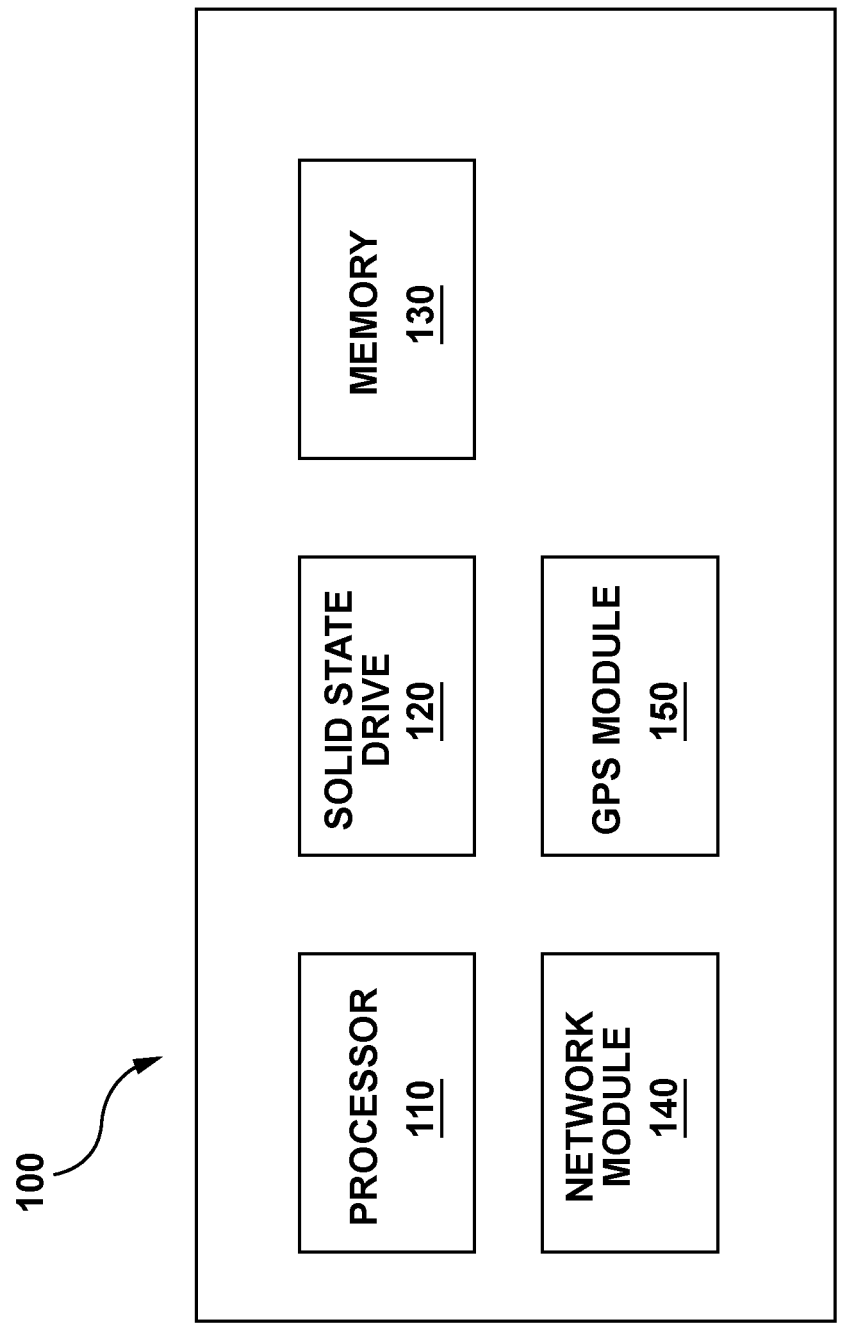
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory, a network module 140, and a GPS module 150. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for displaying information to a user of the computer system 100 as will be described in further detail below. For example, the program instructions may be part of a mapping or navigational application executable by the processor 110. The network module 140 and the GPS module 150 allow communication between different computer systems, servers and/or other devices.

Figure 2:
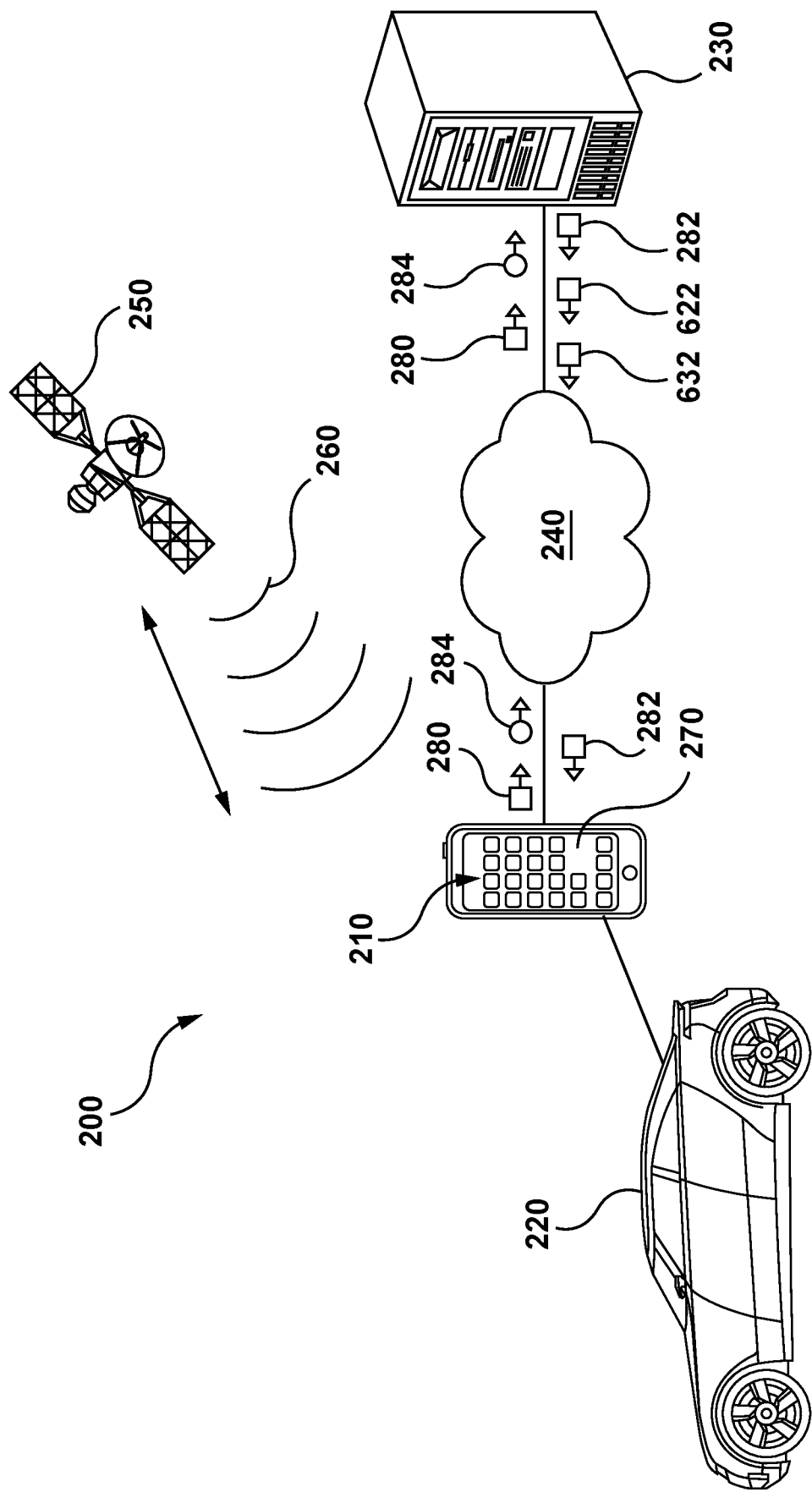
FIG. 2 depicts a schematic diagram of an example networked computing environment in which certain embodiments of systems and/or methods of the present technology may be implemented.

FIG. 2 illustrates a networked computing environment 200 suitable for use with some embodiments of the systems and/or methods of the present technology. The networked computing environment 200 comprises an electronic device 210 associated with a vehicle 220, or associated with a user (not depicted) who can operate the vehicle 220, a server 230 in communication with the electronic device 210 via a communications network 240 (e.g. the Internet or the like, as will be described in greater detail herein below), and a GPS satellite 250 transmitting and/or receiving a GPS signal 260 to/from the electronic device 210. It will be understood that the present technology is not limited to GPS and may employ a positioning technology other than GPS.

The implementation of the electronic device 210 is not particularly limited, but as an example, the electronic device 210 may be implemented as a wireless communication device such as a mobile telephone (e.g. a smart phone or a radio-phone), a vehicle navigation device (e.g. TomTom™, Garmin™), a tablet, a personal computer and the like. However in FIG. 2, the electronic device 210 is depicted as the smart phone.

The electronic device 210 may comprise some or all of the components of the computer system 100 depicted in FIG. 1. In some embodiments, the electronic device 210 comprises the network module 140 for communicating with the server 230 via the communications network 240, the GPS module 150 for receiving and transmitting the GPS signal 260 to the GPS satellite 250 (i.e., for enabling GPS capabilities of the electronic device 210), the processor 110, the memory 130, and a display interface or simply a display 270, such as a touch-screen for example. The electronic device 210 comprises hardware and/or software and/or firmware, or a combination thereof, for receiving navigational information, as will be described in greater detail below.

The vehicle 220 to which the electronic device 210 is associated may comprise any leisure or transportation vehicle such as a private or commercial car, truck, motorbike or the like. The vehicle 220 may be user operated or a driver-less vehicle. As previously mentioned, the user associated with the vehicle 220 may also be associated with the electronic device 210. It should be noted that the fact that the electronic device 210 is associated with the user does not need to suggest or imply any mode of operation—such as a need to log in, a need to be registered or the like. Similarly, the fact that the electronic device 210 is associated with the vehicle 220 does not need to suggest or imply any mode of operation. In other words, the associations between the user, the vehicle 220 and the electronic device 210 denote the assumption that the user has the electronic device 210 and is travelling in the vehicle 220.

In some embodiments of the present technology, the communications network 240 is the Internet. In alternative non-limiting embodiments, the communication network can be implemented as any suitable local area network (LAN), wide area network (WAN), a private communication network or the like. It should be expressly understood that implementations for the communication network are for illustration purposes only. How a communication link (not separately numbered) between the electronic device 210 and the communications network 240 is implemented will depend inter alia on how the electronic device 210 is implemented.

Merely as an example and not as a limitation, in those embodiments of the present technology where the electronic device 210 is implemented as a wireless communication device such as a smart phone or a navigation device, the communication link can be implemented as a wireless communication link. Examples of wireless communication links include, but are not limited to, a 3G communication network link, a 4G communication network link, and the like. The communications network 240 may also use a wireless connection with the server 230. As it will be described further herein below, the communications network 240 is not fault-free and, therefore, may experience some technical difficulties which results in network issues such as data transmission failures.

In some embodiments of the present technology, the server 230 is implemented as a conventional computer server. In one non-limiting example, the server 230 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 230 may be distributed and may be implemented via multiple servers.

In some embodiment of the present technology, the server 230 comprises hardware and/or software and/or firmware, or a combination thereof, for computing and transmitting at least geographic map data and navigational information to the electronic device 210.

To that end, the server 230 may host one or more navigational services that provide at least geographic map data and navigational information to various electronic devices. Indeed, the one or more navigational services of the server 230 may allow the retrieval of relevant geographic map data. The one or more navigational services of the server 230 may also implement a traffic prediction algorithm (not depicted), such as a machine-learning model for example, for determining navigational information.

In some embodiments, merely as an illustration and not a limitation, the navigational service of the server 230 that provides at least the geographical map data and implements the traffic prediction algorithm is Yandex™ Maps.

In some embodiments of the present technology, the traffic prediction algorithm may have been previously trained based on previous user travel information. For example, the server 230 may have been configured to collect large amounts of data associated with a plurality of users travelling around in a given geographical region. This collection of large amounts of data may be known as user geo-tracking. Generally speaking, the server 230 may be configured to (i) analyze these large amounts of data, (ii) determine geographical travel patterns that the plurality of users performed in that given geographical region, and (iii) determine temporal information associated with the geographical travel patterns and which is indicative of travel time intervals and periods of the day during which these geographical travel patterns were performed.

During training, the geographical travel patterns and the respectively associated temporal information may be inputted into the "untrained" traffic prediction algorithm, which in a sense "learns" relationships and data patterns between the geographical travel patterns and the temporal information in order to assess road traffic conditions in the given geographical region and how these road traffic conditions may affect travel times in the given geographical region during various periods of the day. Put another way, the "untrained" traffic prediction algorithm may be trained to assess road traffic that a given user may experience while travelling in the given geographical region during various periods of the day.

For the sake of simplicity, additional training features of the traffic prediction algorithm will be omitted. In some embodiments of the present technology, the centric traffic prediction error parameters can be used as an indication that the traffic prediction algorithm needs to be retrained in order to further improve the prediction formula. In alternative embodiments of the present technology, the centric traffic prediction error parameters can be used as a metric for evaluating changes made to the prediction algorithm (such as part of the A/B testing of changes made to the prediction algorithm). In yet alternative embodiments of the present technology, the centric traffic prediction error parameters can be used as a metric of evaluating quality of the traffic prediction algorithm in different regions. In other embodiments of the present technology, the traffic prediction algorithm may be retrained or adjusted based at least in part on user-centric traffic prediction error parameters. What the user-centric traffic prediction error parameters are and how they are computed will be further described in detail herein below.

Continuing with the description of the traffic prediction algorithm, the "trained" traffic prediction algorithm may determine, in view of the so-assessed road traffic conditions, navigational information for the user based on "initial navigational parameters". The initial navigational parameters may comprise data associated with a Point A, which is a starting position of the given electronic device, and data associated with a Point B, which is a destination position of the given electronic device. The initial navigational parameters may also comprise an indication of a given period of the day for which the navigational information is requested by a given electronic device.

As part of the navigational information, the traffic prediction algorithm may determine one or more routes for travelling from Point A to Point B.

Additionally, as part of the navigational information, the traffic prediction algorithm can determine an estimated travel time for each one of the one or more routes for travelling from Point A to Point B and that for the given period of the day. It should be understood that the estimated travel times for the one or more routes determined by the traffic prediction algorithm are noticeably influenced by the given period of the day. For example, road traffic at 8:30 am (i.e. rush hour) and road traffic at 9:00 pm (i.e. late evening) is very different and, consequently, the estimated travel times for a same route for 8:30 am and for 9:00 pm are likely be very different.

In addition to the data associated with Points A and B and the indication of the given period of the day, the initial navigational parameters may further comprise additional initial travel information indicative of various user-specific navigational preferences. For example, one user may be desirous of being provided with navigational information associated with one or more routes that avoid toll roads or other types of paid-for roads, while another user may be desirous of being provided with navigational information associated with one or more routes that require a smallest amount of travelling time for arriving from Point A to point B.

It should be noted that the initial navigational parameters presented above are not an exhaustive list of all possible initial navigational parameters and should not be interpreted as such. Additional initial navigational parameters that may be transmitted to the server 230 for determining the navigational information may become apparent to a person skilled in the art.

In some embodiments of the present technology, the traffic prediction algorithm implemented by the server 230 may be configured to compute an estimated travel time for each road segment of each one of the one or more routes, instead of directly computing an estimated travel time for each one of the one or more routes. Generally speaking, each one of the one or more routes determined by the server 230 is a sequential combination of road segments that form the each one of the one or more routes. A given road segment may include any part or parts of a road, not limited to the following examples: straight road sections, curves, junctions, crossings, highway sections, tunnels, bridges and the like. Indeed, the traffic prediction algorithm may be configured to compute an estimated travel time for each road segment of a given route and, the estimated travel time for the given route will be computed indirectly as a sum of estimated travel times of each road segment of that given route.

In addition, the traffic prediction algorithm implemented by the server 230 may be configured to compute an estimated travel time for each road segment or each route on a periodical basis. For example, the traffic prediction algorithm may be configured to compute and, therefore, update the estimated travel times every 2, 5, 10 or 15 minutes. Alternatively, the traffic prediction algorithm implemented by the server 230 may be configured to update the estimated travel time for each road segment or each route upon occurrence of certain milestone events, for example, every hour on the hour, upon changing from rush hour to non-rush hour, upon occurrence of a traffic condition (such as an accident), etc. In other words, the traffic prediction algorithm may periodically compute "updated" estimated travel times according to a frequency of computation. This may allow providing current and/or more accurate estimated travel times as the day progresses.

In other embodiments, it is contemplated that periodicity or the frequency of computation of the estimated travel times may vary throughout the day. For example, during rush hours, the traffic prediction algorithm may be configured to compute (i.e., update) an estimated travel time for each road segment or route every 5 minutes. In another example, during late evenings, the traffic algorithm may be configured to compute (i.e., update) an estimated travel time for each road segment or route every 15 minutes. This means that the frequency of computation can vary depending on a given period of the day. This may allow providing more accurate travel times during periods of the day when road traffic is more likely to vary while economizing computational resources and reducing the overall load on the server 230 during periods of the day when road traffic is less likely to vary or is generally low.

How the user may request navigational information from the navigational service of the server 230 will now be described.

Let it be assumed that while the user is travelling in the vehicle 220, the user is desirous of being provided with navigational information. The user may be desirous of such information for many different reasons. For instance, the user may require directions to a destination, and therefore, may desire a predicted route in order to arrive at the destination. In another instance, the user may know a given route in order to arrive at the destination but is desirous of being provided with an alternative predicted route that may be shorter or quicker than the given route or, simply because the given route is inaccessible at the moment (i.e., desirous of being provided with a detour). In yet another instance, the user may highly dislike being stuck in road traffic and may be desirous of being provided with a specific route that avoids high-traffic road segments (heavy road traffic conditions) while travelling to the destination.

To that end, while travelling in the vehicle 220 the user may interact with the electronic device 210 in order to be provided with the navigational information. In some embodiments of the present technology, in response to user interaction with the electronic device 210, the electronic device 210 may execute a navigational application. The navigational application may be a web browser or any application of the electronic device 210 that allows the user to access a navigational service, such as the navigational service provided by the server 230.

Figure 3:
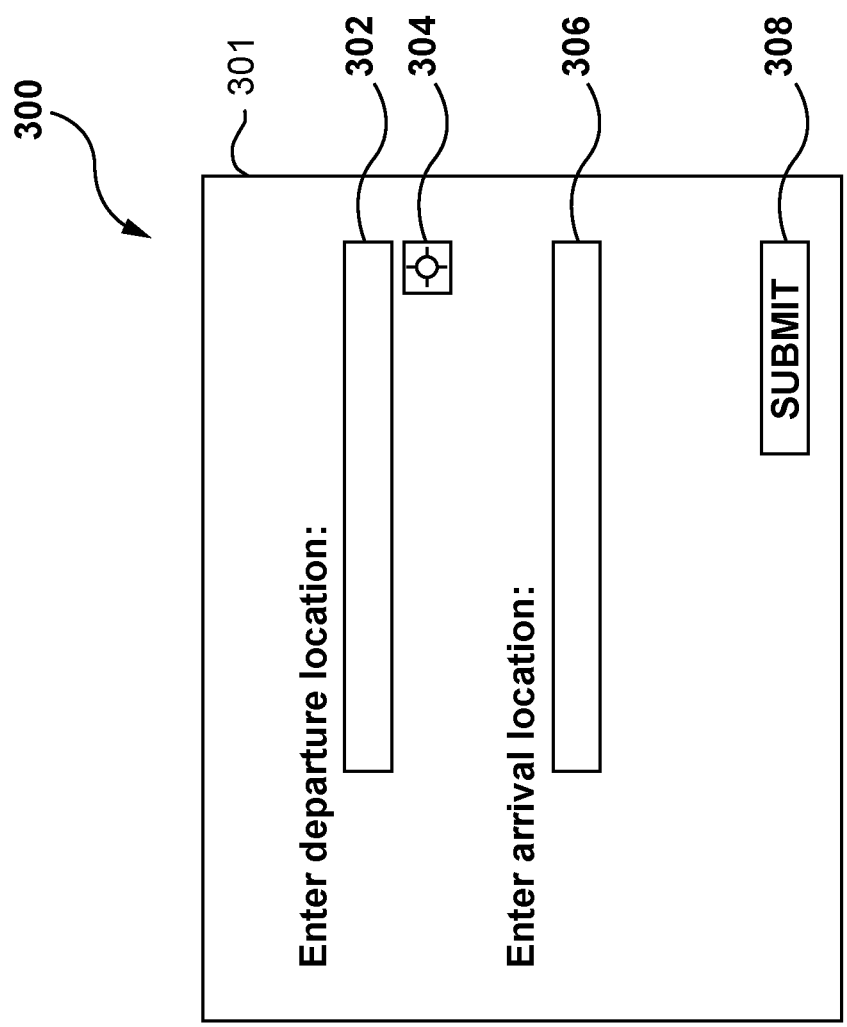
FIG. 3 depicts a representation of a navigational application executed by an electronic device in FIG. 2 and provided to a user of the electronic device for specifying initial navigational parameters.

For example, with reference to FIG. 3, there is depicted a screenshot 300 depicting a representation of a Graphical User Interface (GUI) 301 of the navigational application executed by the electronic device 210. The GUI 301 as depicted in the screenshot 300 may be provided to the user via the display 270 of the electronic device 210. Generally speaking, the GUI 301 may be implemented with a number of fields for allowing the user to input the initial navigational parameters.

In a non-limiting embodiment of the present technology, the GUI 301 may comprise a departure location field 302, a GPS localization button 304, an arrival location field 306 and a submit button 308. In alternative embodiments, the GUI 301 may comprise additional fields, buttons, menus, and the like for allowing the user to input the initial navigational parameters. The user may enter additional navigational parameters corresponding to user-specific navigational preferences via these additional fields, buttons, menus and the like, without departing from the scope of the present technology.

The departure location field 302 is provided to the user for specifying a starting location (i.e., Point A). As such, the user may populate the departure location field 302 with a street address, a postal code, GPS coordinates and the like for specifying the starting location from which the user desires directions. Optionally, the user may be provided with the GPS localization button 304 in order to automatically determine the current location of the electronic device 210 and to select it as the starting location. Upon selecting the GPS localization button 304 by the user, the electronic device 210 may request from the GPS satellite 250 current GPS coordinates of the electronic device 210. As a result, the GPS satellite 250 may provide the current GPS coordinates to the electronic device 210 via the GPS signal 260. When the electronic device 210 receives the current GPS coordinates, the electronic device 210 may be configured to automatically populate the departure location field 302 with the current GPS coordinates. Alternatively, the electronic device 210 may be configured to approximate a current street address next to which the electronic device 210 is currently located based on the current GPS coordinates and to automatically populate the departure location field 302 with the current street address for specifying the starting location from which the user desires directions.

In other embodiments of the present technology, the electronic device 210 may store GPS coordinates associated with previously specified user-desired departure location. For example, the user may have previously specified a given user-desired departure location which has been stored on the solid-state drive 120 of the electronic device 210. Such previously specified user-desired departure locations may in some instances correspond to frequently specified user-desired locations by the user in the past, such as but not limited to: a home address, a work address, a gym address, and the like. As such, upon selecting the GPS localization button 304 by the user, the electronic device 210 may be configured to retrieve the so-stored GPS coordinates associated with one of the previously specified user-desired departure locations. The electronic device 210 may also be configured to automatically populate the departure location field 302 with the GPS coordinates associated with the so-retrieved previously specified user-desired departure location. Alternatively, the electronic device 210 may be configured to retrieve and automatically pre-populate the departure location field 302 with the GPS coordinates associated with the previously specified user-desired departure location upon the provision of the GUI 301 to the user and without the need for the user to select the GPS localization button 304.

The arrival location field 306 is provided to the user for specifying a destination location (i.e., Point B). As such, the user may populate the arrival location field 306 with a street address, a postal code, GPS coordinates and the like, similarly to how the user may populate the departure location field 302, for specifying the destination location to which the user desires directions.

When the starting location, Point A, and the destination location, Point B, are so-specified, the user may select the submit button 308. In some embodiments, a temporal counter may be set on the submit button 308 which is indicative of the current time at which the submit button 308 was selected. This temporal counter may serve as the initial navigational parameter of the period of the day for which the navigational information is to be provided. Alternatively, a time field (not depicted) may be provided to the user for allowing the user to explicitly specify the initial navigational parameter of the period of the day for which the navigational information is to be provided.

For illustration purposes only, let's assume that the user populated the departure location field 302 with a starting location that is not the current location of the electronic device 210 but, instead, is a given location that is in proximity to the current location of the electronic device 210. In other words, let's assume that the departure location field 302 is populated with the given location that is a few minutes away from the current location of the electronic device 210. Let's also assume that the user populated the arrival location field 306 with the desired destination location which is her work address.

Also, let's assume that the user selected the submit button 308 at 9:30 am. By selecting the submit button 308, the user may submit a request for navigational information to the server 230. Put another way, following the selection of the submit button 308, the initial navigational parameters may be sent via the communications network 240 or otherwise transmitted to the server 230 for processing. To that end, upon selection of the submit button 308, the electronic device 210 may be configured to generate an initial request data packet 280 depicted in FIG. 2 comprising at least data representative of the initial navigational parameters specified or otherwise provided by the user. The electronic device 210 may then transmit the initial request data packet 280 to the server 230.

Upon receiving the initial request data packet 280, the server 230 may analyze the initial request data packet 280 and transmit the initial navigational parameters to the navigational service implemented thereby. The server 230 may be configured to process the initial navigational parameters and generate a response data packet 282 comprising data representative of at least geographical map data and navigational information 501 depicted in FIG. 5 for travelling from Point A to Point B.

The navigational information 501 computed by the server 230 may comprise inter alia a first route data 500 and a second route data 502. The first route data 500 is associated with a first route determined by the traffic prediction algorithm for travelling from Point A to Point B and the second route data 502 is associated with a second route determined by the traffic prediction algorithm for travelling from Point A to Point B. The first route data 500 is associated with two road segments A and B. In other words, the first route determined by the traffic prediction algorithm corresponds to the road segments A and B. The second route data 502 is associated with two other road segments C and D. In other words, the second route determined by the traffic prediction algorithm corresponds to the road segments C and D. Put another way, the traffic prediction algorithm determined that the user may travel from Point A to Point B via the road segments A and B (i.e., travelling along the first route) or by travelling along the road segments C and D (i.e., travelling along the second route).

The first route data 500 also comprises respective estimated travel times for each one of the road segments A and B. Similarly, the second route data 502 also comprises respective estimated travel times for each one of the road segments C and D. It should be noted that the estimated travel times for the road segments A, B, C and D have been computed by the traffic prediction algorithm at 9:30 am (i.e., immediately or shortly after receiving the initial request data packet 280).

The traffic prediction algorithm determined at 9:30 am that if the user travels along the first route from Point A to Point B, it will take the user 9 minutes in total (i.e., 2 minutes for the road segment A and 7 minutes for the road segment B). The traffic prediction algorithm also determined at 9:30 am that if the user travels along the second route from Point A to Point B, it will take the user 10 minutes in total (i.e., 5 minutes for the road segment C and 5 minutes for the road segment D). It should be noted that estimated travel times associated with each road segment or route may be indicative of estimated road traffic conditions of the respective road segments or routes that are otherwise comparable in length. Indeed, the higher a given estimated travel time is, the heavier the road traffic conditions are for the respective road segment or route. Similarly, the lower the given estimated travel time is, the lighter the road traffic conditions are for the respective road segment or route that are otherwise comparable in length.

It should be noted that the first route data 500 and the second route data 502 is a non-limiting example of the navigational information 501 and that the navigational information 501 determined by the traffic prediction algorithm may comprise additional data to the first route data 500 and the second route data 502. For example, the navigational information 501 may comprise additional data if the traffic prediction algorithm determined more than two routes for travelling from Point A to Point B. In another example, the navigational information 501 may comprise additional information if either route amongst the first route and the second route corresponds to more than two road segments. In yet another example, the navigational information 501 may further comprise geo-coding information for positioning/locating the first route and the second route within the geographical map data provided by the navigational service of the server 230. The geo-coding information may allow determining the corresponding locations of the road segments A, B, C and D with respect to the geographical map data and position the road segments A, B, C and D, according to the so-determined corresponding locations, within the geographical map data.

As previously mentioned, after determining geographical map data and the navigational information 501, the server 230 may transmit the response data packet 282 to the electronic device 210 via the communications network 240. The electronic device 210 may acquire the response data packet 282 from the server 230 at a first moment in time. In this example, the first moment in time at which the electronic device 210 acquires the response data packet 282 is 9:30 am (i.e., immediately or shortly after the determination of geographical map data and the navigational information 501)

Figure 4:
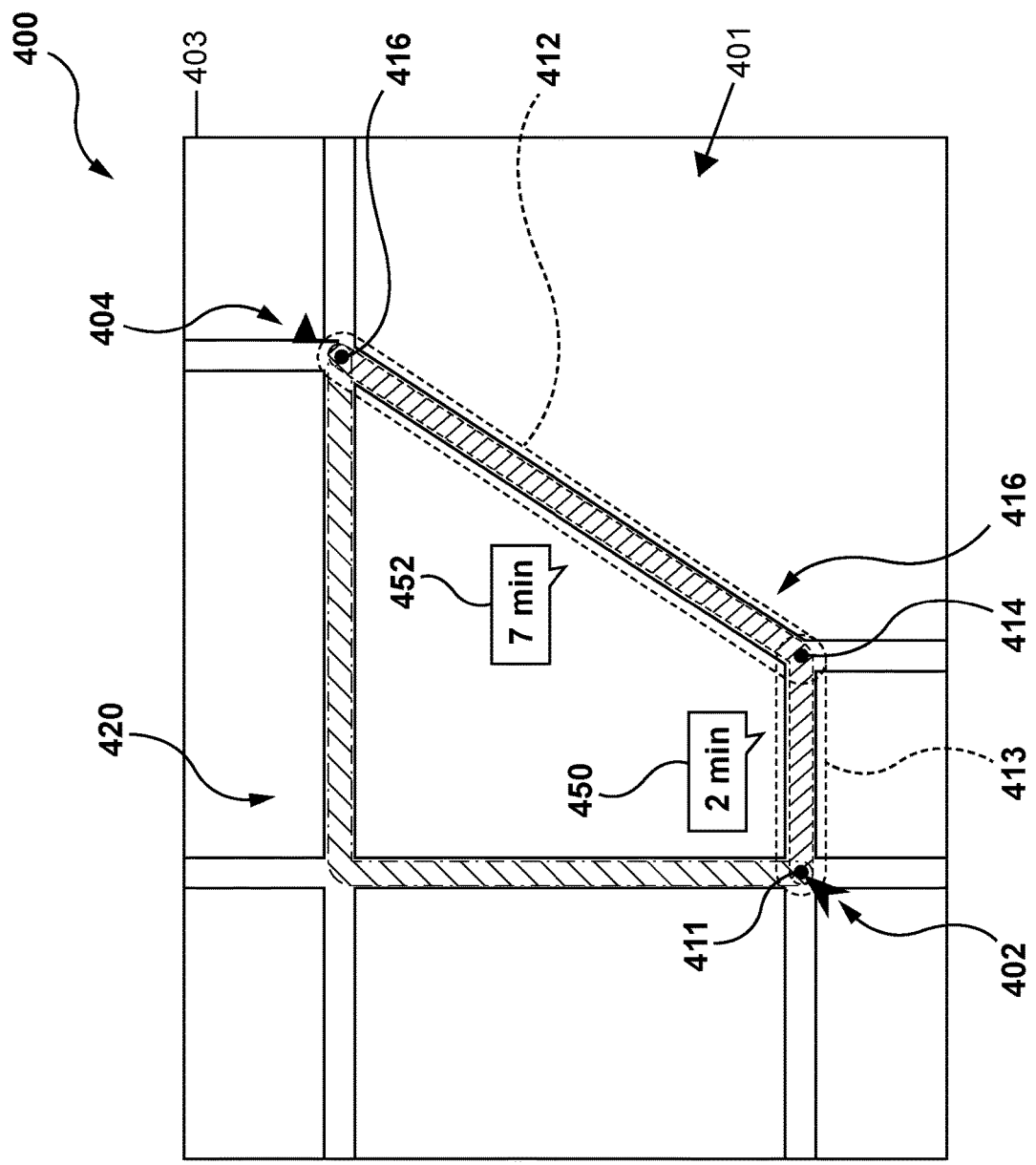
FIG. 4 depicts a representation of a navigational application executed by an electronic device in FIG. 2 and provided to a user of the electronic device for providing an application-generated version of navigational information determined by a server of FIG. 2.

In addition to the data representative of at least the geographical map data and the navigational information 501, the response data packet 282 may comprise data for triggering a display of a GUI 403 (a screenshot 400 of a representation of the GUI 403 is depicted in FIG. 4) of the navigational application executed by the electronic device 210. In some embodiments of the present technology, the display of the GUI 403 may be triggered by an indication of the electronic device 210 approaching a given road segment within any one of the first route data 500 and the second route data 502. In some embodiments, the electronic device 210 may be configured to analyze the response data packet 282 in order to determine when it approaches the given road segment. This determination may be enabled via GPS capabilities of the electronic device 210. If the electronic device 210 determines that it approaches the given road segment it can provide an indication thereof to the navigational application. In response, the navigational application may provide the user with the GUI 403.

In other words, at a second moment in time that corresponds to a moment in time at which the electronic device 210 approaches the given road segment, the electronic device 210 may be triggered to display the GUI 403. In this example, upon the electronic device 210 approaching a first road segment 413 which corresponds to the road segment A in FIG. 5, the electronic device 210 triggers the display of the GUI 403. Let's assume that the second moment in time upon which the electronic device 210 approaches the first road segment 413 (i.e., road segment A in FIG. 5) is 9:35 am. Therefore, the GUI 403 is displayed to the user at 9:35 am (i.e., the second moment in time).

The GUI 403 of the navigational application can be said to display an "application-generated" version of the geographical map data (which was acquired via the response data packet 282) and an "application-generated" version of the navigational information 501 (which was also acquired via the response data packet 282). In other words, the GUI 403, which is displayed to the user at the second moment in time (i.e., 9:35 am), comprises the application-generated version of the geographical map data and the application-generated version of the navigational information 501 both of which were generated based on data that has been acquired by the electronic device 210 at the first moment in time (i.e., 9:30 am). This also means that the electronic device 210 displays at 9:35 am the application-generated version of the navigational information 501 that was determined by the traffic prediction algorithm at 9:30 am. In other words, the application-generated version of the geographical map data and the application-generated version of the navigational information 501 are generated based on the most recent information available from the server 230 acquired as part of the response data packet 282. Hence, it can be said that the user of the electronic device 210 appreciates traffic information as presented to her via the GUI 403 based on the most recent data that is available to the electronic device 210 at the moment when the GUI 403 is generated.

In this non-limiting embodiment of the present technology, the GUI 403 comprises a map image 401 which is a portion of a map that is displayed to the user via the GUI 403. The map image 401 is the application-generated version of the geographical map data that was generated by the server 230. In some embodiments, the geographical map data may have been generated at least partially based on the initial navigational parameters. Indeed, the server 230 may have generated the geographical map data or otherwise select the geographical map data associated with the potion of the map that includes the starting location and the destination location, which were both provided to the server 230 as part of the initial navigational parameters.

Also, the application-generated version of the navigational information 501 may comprise a user icon 402, a destination icon 404, a main route 410 and a secondary route 420. The user icon 402 may be positioned over the map image 401 so as to correspond to the starting location (i.e., Point A) on the map image 401. Similarly, the destination icon 404 may be positioned over the map image 401 so as to correspond to the destination location (i.e., Point B) on the map image 401. This positioning may be enabled by the geo-coding information that was acquired via the response data packet 282. Indeed, the geo-coding information may allow determining the corresponding locations of the user icon 402 and of the destination icon 404 with respect to the map image 401 in the GUI 403.

The main route 410 is a first visually distinguished travel path on the map image 401. In this case, the main route 410 of the GUI 403 is generated based on the first route data 500 depicted in FIG. 5. Similarly, the secondary route 420 is a second visually distinguished travel path on the map image 401. In this case, the secondary route 420 of the GUI 403 is generated based on the second route data 502 depicted in FIG. 5. The first visually distinguished travel path allows distinguishing the main route 410 from the rest of the map image 401. The second visually distinguished travel path allows distinguishing the secondary route 420 from the rest of the map image 401. Additionally, the first and second visually distinguished travel paths allow the user distinguishing the main route 410 from the secondary route 420 in the GUI 403.

As previously mentioned, each one of the one or more routes computed by the server 230 is a sequential combination of road segments determined by the server 230 for travelling from the starting location to the destination location. Put another way, each one of the one or more routes may include one or more road segments that the user may take for travelling from the starting location towards the destination location.

As such, the main route 410 corresponds to two road segments that comprise a first road segment 413, which begins at point 411 along the main route 410 and ends at point 414 along the main route 410, and a second road segment 412, which begins at the point 414 along the main route 410 and ends at point 416 along the main route 410. In this example, the first road segment 413 and the second road segment 412 are generated based on the first route data 500 of the navigational information 501 acquired from the server 230. More specifically, the first road segment 413 and the second road segment 412 are generated based on the navigational information 501 that is associated with the road segments A and B, respectively, in FIG. 5.

Figure 5:
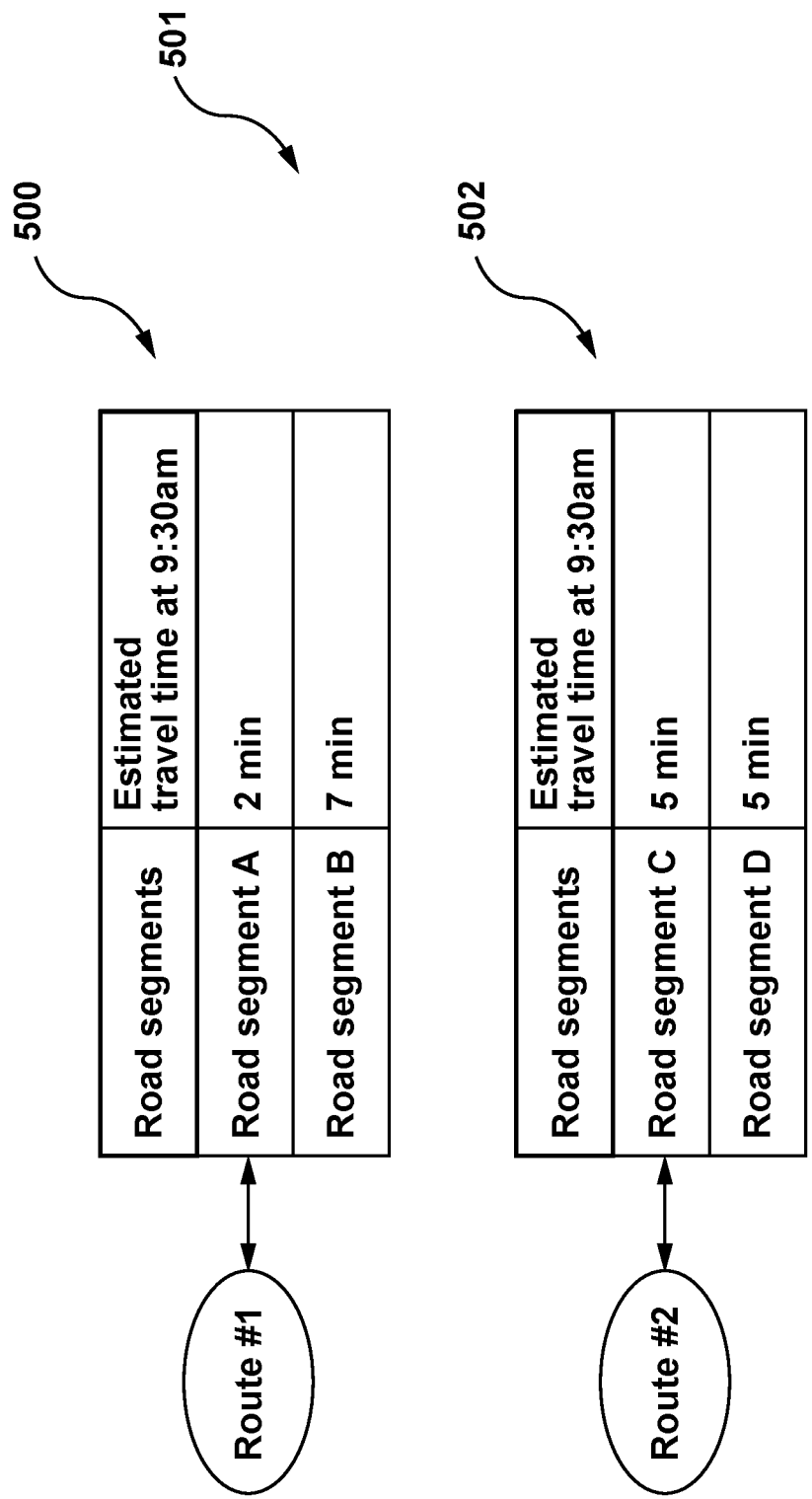
FIG. 5 is a visual representation of the navigational information determined by the server of FIG. 2.

A first indicator 450 associated with the first road segment 413 is generated based on the navigational information 501 that was acquired from the server 230 and that is associated with the estimated travel time for the road segment A in FIG. 5. Similarly, a second indicator 452 associated with the second road segment 412 is generated based on the navigational information 501 that was acquired from the server 230 and that is associated with the estimated travel time for the road segment B in FIG. 5. The first and second indicators 450 and 452 may be positioned over the map image 401 in visual proximity to the respective first and second road segments 413 and 412 in the GUI 403 so as to convey to the user their associations with the respective first and second road segments 413 and 412.

It is contemplated that the first indicator 450 and the second indicator 452 may display application-generated road traffic conditions for the first and the second road segments 413 and 412, respectively. In some embodiments, instead of displaying travel times via the first indicator 450 and the second indicator 452, the first indicator 450 and the second indicator 452 may provide color indications. In one example, a green color indication may represent a light road traffic condition and, therefore, a short expected travel time. In another example, a red color indication may represent a heavy road traffic condition and, therefore, a longer expected travel time than if the color indication was green. Nevertheless, irrespective of whether the first and second indicators 450 and 452 display given travel times and/or color indications, the first and second indicators 450 and 452 provide to the user the application-generated road traffic conditions that are representative of expected travel times by the user for the respective road segments.

Thus, it can be said that, the first indicator 450 and the second indicator 452 of the GUI 403 display respective application-generated road traffic conditions being representative of the respective expected travel times by the user (i.e., based on the estimated travel times for the road segments A and B in FIG. 5) for the first and second road segments 413 and 412, respectively, on the GUI 403.

It should be noted that, in this example, it is assumed that the user chooses to travel from Point A to Point B along the main route 410. Therefore, for the sake of simplicity, indicators for road segments of the secondary route 420 are omitted in the screenshot 400. However, alternatively, indicators for road segments of the secondary route 420 may be generated based on the navigational information 501 that was acquired from the server 230 and that is associated with the estimated travel time for the road segments C and D in FIG. 5.

Figure 6:
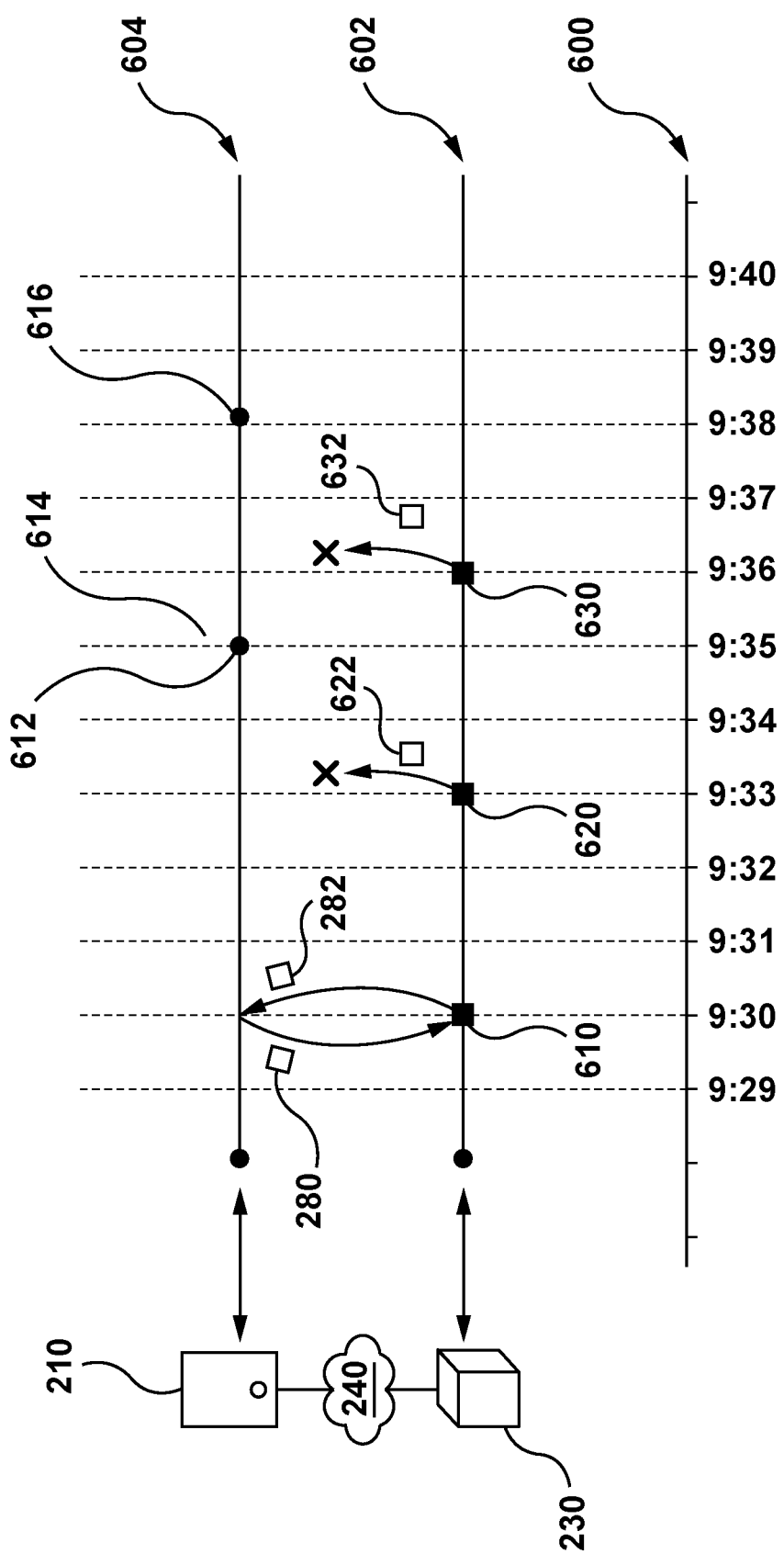
FIG. 6 depicts a time line representation of information exchange between the electronic device and the server of FIG. 2.

In summary and with reference to FIG. 6, there is depicted a general timeline 600, a server-event timeline 602 associated with events occurring at the server 230 and a device-event timeline 604 associated with events occurring at the electronic device 210. The user may provide the initial navigational parameters by populating the departure location field 302 (see FIG. 3), the arrival location field 306 and by selecting the submit button 308. It is assumed that the user selected the submit button 308 at 9:30 am. The electronic device 210 may then transmit the initial request data packet 280 to the server 230 upon the selection of the submit button 308. The server 230 may acquire the initial request data packet 280 and may provide the traffic prediction algorithm with the initial navigational parameters that were initially provided by the user. The traffic prediction algorithm may determine at 9:30 am the navigational information 501 depicted in FIG. 5.

This determination of the navigational information 501 by the traffic prediction algorithm is represented in FIG. 6 by a first determination procedure indicator 610. Then, the electronic device 210 may acquire at 9:30 am the response data packet 282. This means that the electronic device 210 may acquire the navigational information 501 during the first moment in time which is 9:30 am.

The electronic device 210 may also determine via its GPS functionality that it is approaching the road segment A of the first route data 500 (see FIG. 5). Therefore, upon the electronic device 210 approaching the road segment A at the second moment in time being 9:35 am, the electronic device 210 may be triggered to display the representation of the GUI 403 of the navigational application (see the screenshot 400 of FIG. 4) to the user. In FIG. 6, an approach indicator 612 represents the determination that the electronic device 210 is approaching the road segment A. A display indicator 614 represents the display of the GUI 403 to the user.

As previously mentioned, the GUI 403 provides the user with the application-generated version of the navigational information 501. In fact, the GUI 403 provides the user with the application-generated version of a most recently acquired navigational information from the server 230. In this example and as it will be further explained below, the most recently acquired navigational information by the electronic device 210 from the server 230 is the navigational information 501 acquired from the server 230 via the response data packet 282.

As previously mentioned, the traffic prediction algorithm implemented by the server 230 may be configured to compute (and update) estimated travel times for each road segment or each route on a periodical basis. With reference to FIG. 6, in addition to the first determination procedure indicator 610, there is depicted a second determination procedure indicator 620. The second determination procedure indicator 620 is representative of the server 230 generating a second determination of the navigational information by the traffic prediction algorithm. In this example, the determinations of the navigational information by the traffic prediction algorithm are periodically executed every 3 minutes. This means that the traffic prediction algorithm determines "updated" navigational information every 3 minutes. It should be noted that the periodicity of this determination can vary depending on specific implementations of the present technology.

Generally speaking, the second determination procedure indicator 620 is representative of the server 230 generating the second determination of the navigational information that is an updated version of the traffic prediction vis-a-vis the traffic prediction indicated by the the first determination procedure indicator 610. As it should be appreciated, the updated traffic prediction could be the same as the original traffic prediction (if the road traffic conditions have not changed) or it can be slightly or even significantly different from the original traffic prediction. For example, if a major traffic accident happened between the time of the updated traffic prediction and the original traffic prediction, the updated traffic prediction will be significantly different from the original traffic prediction.

Scenario 1

Figure 7:
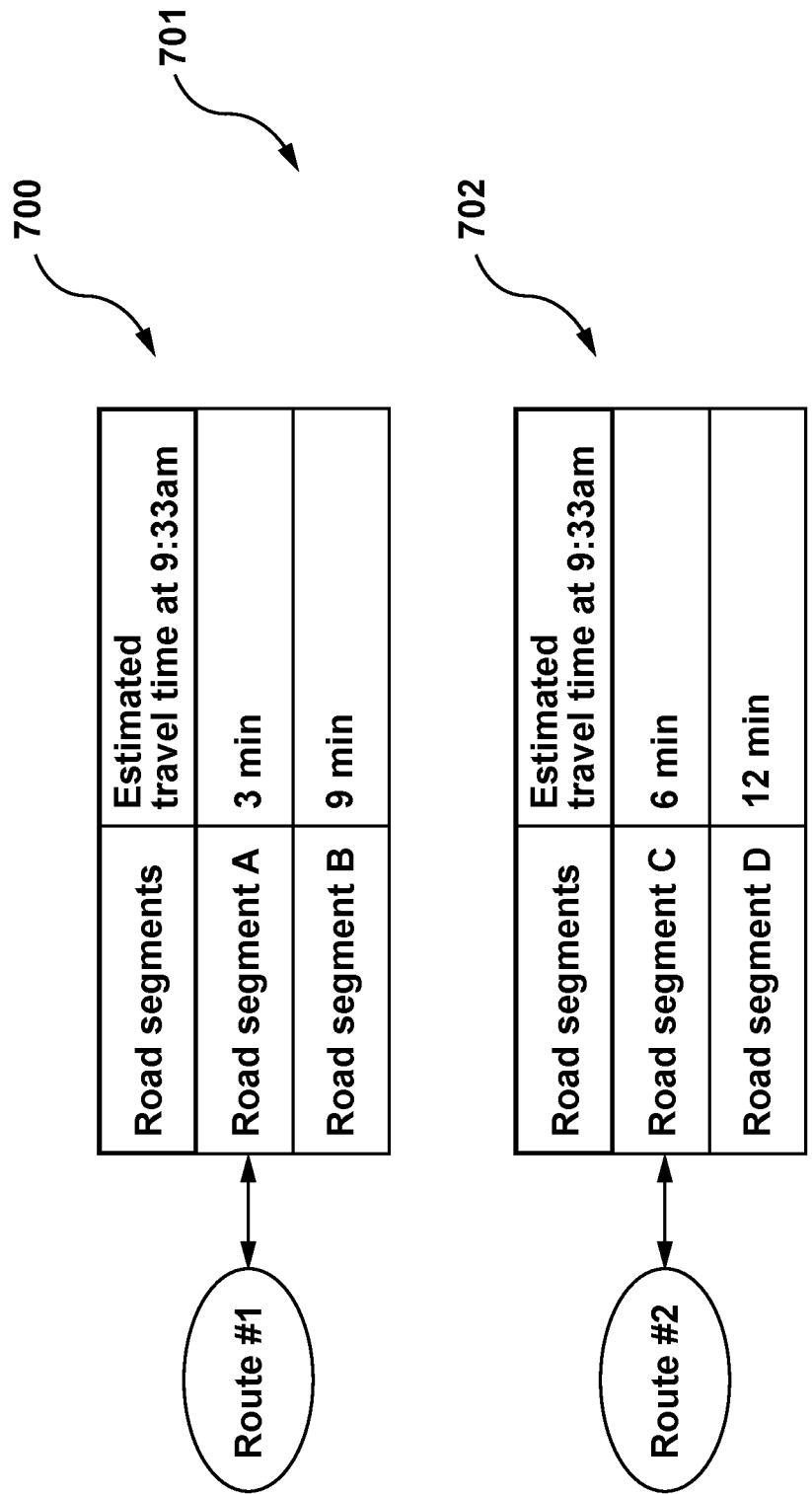
FIG. 7 is a visual representation of first updated navigational information determined by the server of FIG. 2.

In some embodiments of the present technology, it is contemplated that after the second determination of the navigational information at 9:33 am (i.e., 3 minutes after that the determination of the navigational information 501 has been executed), the server 230 may be configured to generate and send a second response data packet 622 which comprises inter alia first updated navigational information 701 depicted in FIG. 7. The first updated navigational information 701 is representative of a first "update" of the navigational information 501 and comprises a first updated route data 700 associated with the first route and a second updated route data 702 associated with the second route. The first updated route data 700 comprises an estimated travel time for the road segment A of 3 minutes (which was computed at 9:33 am) and for the road segment B of 9 minutes (which was computed at 9:33 am). Similarly, the second updated route data 702 comprises an estimated travel time for the road segment C of 6 minutes (which was computed at 9:33 am) and for the road segment D of 12 minutes (which was computed at 9:33 am).

It should be understood that at 9:33 am, the server 230 may not be aware that the user is planning on travelling along the main route 410 (i.e., the first route) and, therefore, determines the second updated route data 702. However, in some embodiments, the determination of the second updated route data 702 may be omitted and, therefore, not be part of the first updated navigational information 701, without departing from the scope of the present technology.

It should be noted that, if the interval of time between the first moment in time and the second moment in time (in this case 5 minutes) is superior to the frequency of computation (in this case 3 minutes), at the second moment in time, "updated" navigational information should have been computed by the server 230. Put another way, if the interval of time between the first moment in time and the second moment in time is superior to the frequency of computation, by the time the electronic device 210 approaches the first road segment 413, "updated" navigational information has been computed by the traffic prediction algorithm and is available at the server 230.

It may so happen that although the server 230 has generated and sent the second response data packet 622, for some reason, the second response data packet 622 was not transmitted all the way to or otherwise has not been acquired by the electronic device 210. This non-acquisition of the second response data packet 622 by the electronic device 210 may have been caused by the following non-limiting list of issues: poor or absent network connectivity of the electronic device 210 at 9:33 am and shortly after, high network congestion, corrupted data packets, faulty network hardware, signal interference and the like. Irrespective of a specific reason why the second response data packet 622 has not been acquired by the electronic device 210, in scenario 1 it shall be assumed that the second response data packet 622 has not been acquired by the electronic device 210.

As a result, at the second moment in time being 9:35 am, the electronic device 210 will display the application-generated version of the navigational information 501 acquired via the response data packet 282, since at 9:35 am it was the most recently acquired navigational information by the electronic device 210. Even though the server 230 sent the second response data packet 622 with "updated" navigational information (i.e., the first updated navigational information 701), the user is provided at 9:35 am with "outdated" navigational information (i.e., the navigational information 501) for the first route since the electronic device 210 never acquired the second response data packet 622.

While the user is travelling along the first route, the electronic device 210 displays the application-generated version of the navigational information 501 and, as a result, the user expects that it will take her 2 minutes in order to pass the first road segment 413, such as indicated by the first indicator 450. While viewing the GUI 403, the user is not aware that the application-generated road traffic condition provided via the first indicator 450 is based on "outdated" navigational information (i.e., the navigational information 501).

Let's assume that it takes the user 3 minutes to pass the first road segment 413. In other words, let's assume that an actual travel time for the user for arriving from the point 411 to the point 414 is 3 minutes. Since the user is provided with the application-generated road traffic condition via the first indicator 450 (which did not provide an indication of 3 minutes), the user may assume that the estimated travel time determined by the server 230, based on which the application-generated road traffic prediction was generated, is erroneous, since the user is not aware that the "updated" navigational information (i.e., the first updated navigational information 701) correctly estimated, at 9:33 am, the amount of time that it should take the user to pass the first road segment 413 (i.e., road segment A).

Without wishing to be bound to any specific theory, in at least some embodiments of the present technology, it is contemplated that the user may be dissatisfied with the application-generated road traffic condition (with respect to the actual road traffic condition) being provided thereto even though the server 230 determined a correct estimated travel time after an "update", since the user is not aware of the correct "updated" estimated travel time. Furthermore, at a third moment in time being 9:38 am, when the electronic device 210 departs from the first road segment 413 (i.e., passes the point 414), or as soon as the network issues are resolved, the server 230 may receive an indication of the actual travel time which is 3 minutes. The third moment in time is represented by a departure indicator 616 in FIG. 6. Therefore, since the server 230 is not aware that the second response data packet 622 was not transmitted all the way to or otherwise not acquired by the electronic device 210, the server 230 may compare the "updated" estimated travel time of the first updated navigational information 701 with the actual travel time and, as a result, may determine that there is no discrepancy between these times. This means that the user-centric dissatisfaction associated with the GUI 403 may be undetectable from the perspective of the server 230.

In other words, since the server 230 is not "aware" that the second response data packet 622 was not transmitted all the way to or otherwise not acquired by the electronic device 210, the server 230 is not "aware" that the application-generated road traffic condition that is provided to the user is based on the "outdated" navigational information 501. This means that the server 230 is not "aware" that the user is dissatisfied with the application-generated road traffic condition provided via the first indicator 450 of the GUI 403.

With reference to FIG. 9, there is depicted a device-side intelligence 900 associated with the electronic device 210 and the user and a server-side intelligence 902 associated with the server 230. Both the device-side intelligence 900 and the server-side intelligence 902 are depicted in FIG. 9 according to the scenario 1. The server-side intelligence 902 is determined by the server 230 and is indicative of the fact that, from the perspective of the server 230, the estimated road traffic condition for the first road segment 413 that the user should have been provided with is based on "updated" navigational information (i.e., the first updated navigational information 701). Therefore, the server 230 stores 3 minutes as the expected travel time by the user for the first road segment 413,which is not the application-generated road traffic condition provided to the user (which is an erroneous assessment by the server 230). It is contemplated that, after determining the server-side intelligence 902, the server 230 may be configured to store information associated with the server-side intelligence 902 on the solid-state drive 120 thereof, for example.

On the other hand, device-side intelligence 900 is determined by the electronic device 210 and is indicative of the fact that, from the perspective of the electronic device 210 and the user, the expected travel time by the user for the first road segment 413 is based on the navigational information 501 acquired via the most recently acquired data packet from the server 230. Therefore, the electronic device 210 stores 2 minutes as the expected travel time for the first road segment 413 which is the application-generated road traffic condition provided to the user (which is the correct assessment by the electronic device 210). It is contemplated that, after determining the device-side intelligence 900, the electronic device 210 may be configured to store information associated with the device-side intelligence 900 on the solid-state drive 120 thereof, for example.

As a result, due to the erroneous assessment of the server 230 with respect to the expected travel time by the user for the first road segment 413, the server-side intelligence 902 indicates that the difference between the expected travel time by the user for the first road segment 413 and the actual travel time for the first road segment 413 is 0 minutes. On the other hand, the device-side intelligence 900 indicates that the difference between the expected travel time by the user for the first road segment 413 and the actual travel time for the first road segment 413 is −1 minute.

Therefore, in at least some embodiments of the present technology, providing an indication of user-centric dissatisfaction associated with the GUI 403 from the electronic device 210 to the server 230 may be desired. Indeed, providing the device-side intelligence 900 associated with the electronic device 210 and the user to the server 230 may be beneficial for enabling a retraining of the traffic prediction algorithm of the server 230. In at least some embodiments of the present technology, providing the indication of the user-centric dissatisfaction associated with the GUI 403 may be desired since, in some instances such as in the scenario 1, the user-centric dissatisfaction associated with the GUI 403 may be undetectable by the server 230. The adjustment of the traffic prediction algorithm may allow determining earlier in time the correct navigational information than without such adjustment and, therefore, provide a more accurate GUI to the user earlier in time.

To that end, in some embodiment of the present technology, the electronic device 210 may be configured to compute the user-centric traffic prediction error parameter. This user-centric traffic prediction error parameter is computed based on the application-generated road traffic condition for a given road segment and the actual road traffic condition for the given road segment.

In the scenario 1, the user-centric traffic prediction error parameter is a difference between 2 minutes (i.e., expected travel time represented by the application-generated road traffic condition, at 9:30 am for the first road segment 413) and 3 minutes (i.e., the actual travel time, which is indicative of the actual road traffic condition, that the user required for passing the first road segment 413). The user-centric traffic prediction error parameter is also indicative of a difference between the estimated road traffic condition assessed by the server 230 for 9:30 am for the first road segment 413 and the actual road traffic condition experienced by the user after passing the first road segment 413.

The electronic device 210 may be configured to generate an error data packet 284 comprising information representative of the user-centric traffic prediction error parameter. The electronic device 210 may then send the error data packet 284 to the server 230 via the communications network 240 as soon as possible (i.e., when the issues with the communications network 240 are resolved).

Alternatively, the error data packet 284 may comprise the information representative of the device-side intelligence 900 so that the user-centric traffic prediction error parameter can be computed at the server 230 based on the device-side intelligence 900. Moreover, the server 230 may be configured to compare the device-side intelligence 900 and the server-side intelligence 902. If the server 230 determines that the server-side intelligence 902 is different from the device-side intelligence, the server 230 may determine that at least one data packet comprising "updated" navigational information was not transmitted all the way to or otherwise not acquired by the electronic device 210.

Scenario 2

For the illustration of the scenario 2, it should be noted that in addition to the first determination procedure indicator 610 and the second determination procedure indicator 620, a third determination procedure indicator 630 is depicted in FIG. 6 and is representative of a third determination of the navigational information by the traffic algorithm (i.e., another "update" of navigational information).

As previously mentioned, the determinations of the navigational information by the traffic prediction algorithm are periodically executed every 3 minutes. This means that the traffic prediction algorithm determines "updated" navigational information every 3 minutes.

Figure 8:
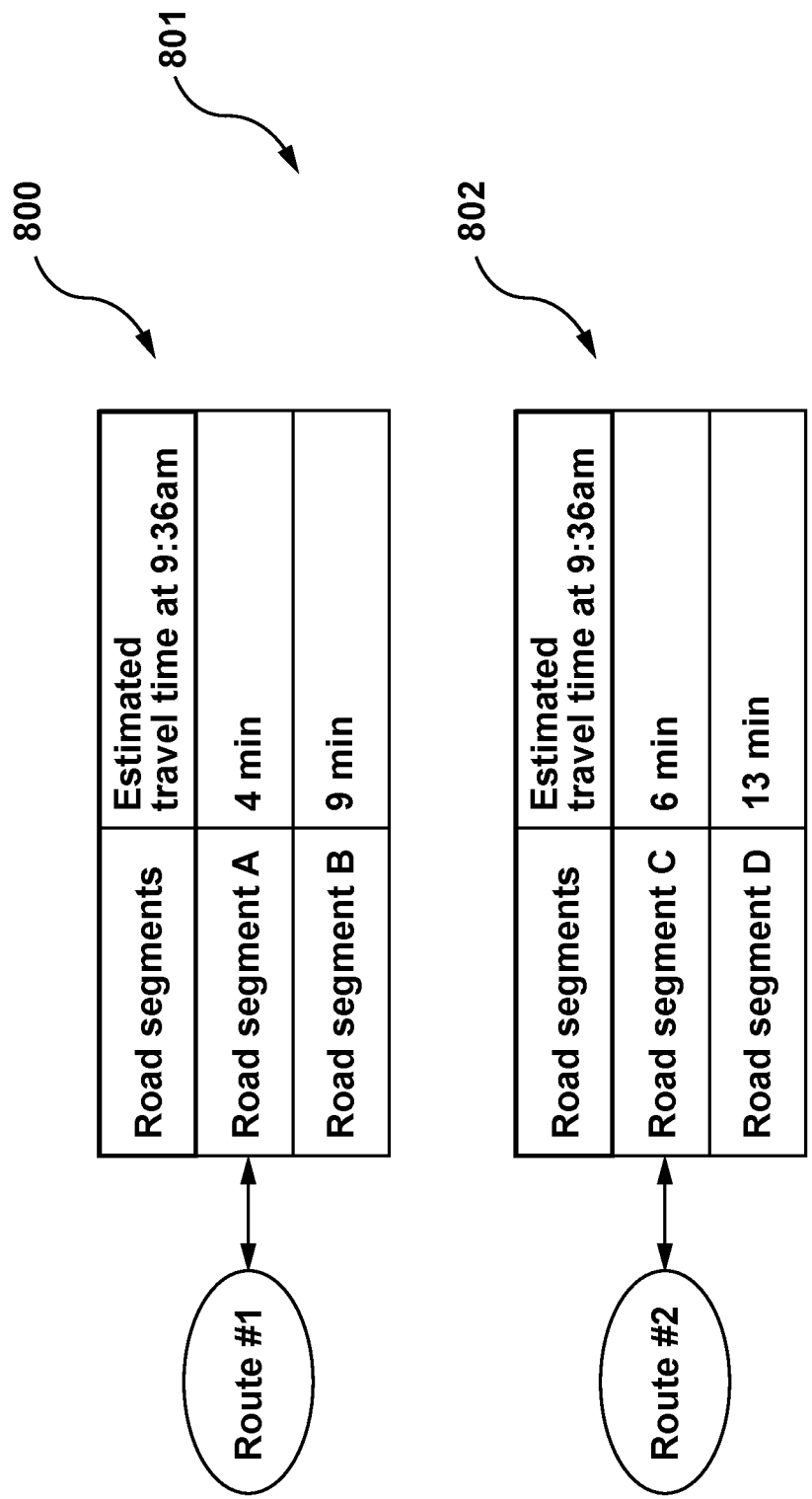
FIG. 8 is a visual representation of second updated navigational information determined by the server of FIG. 2.
Figure 11:
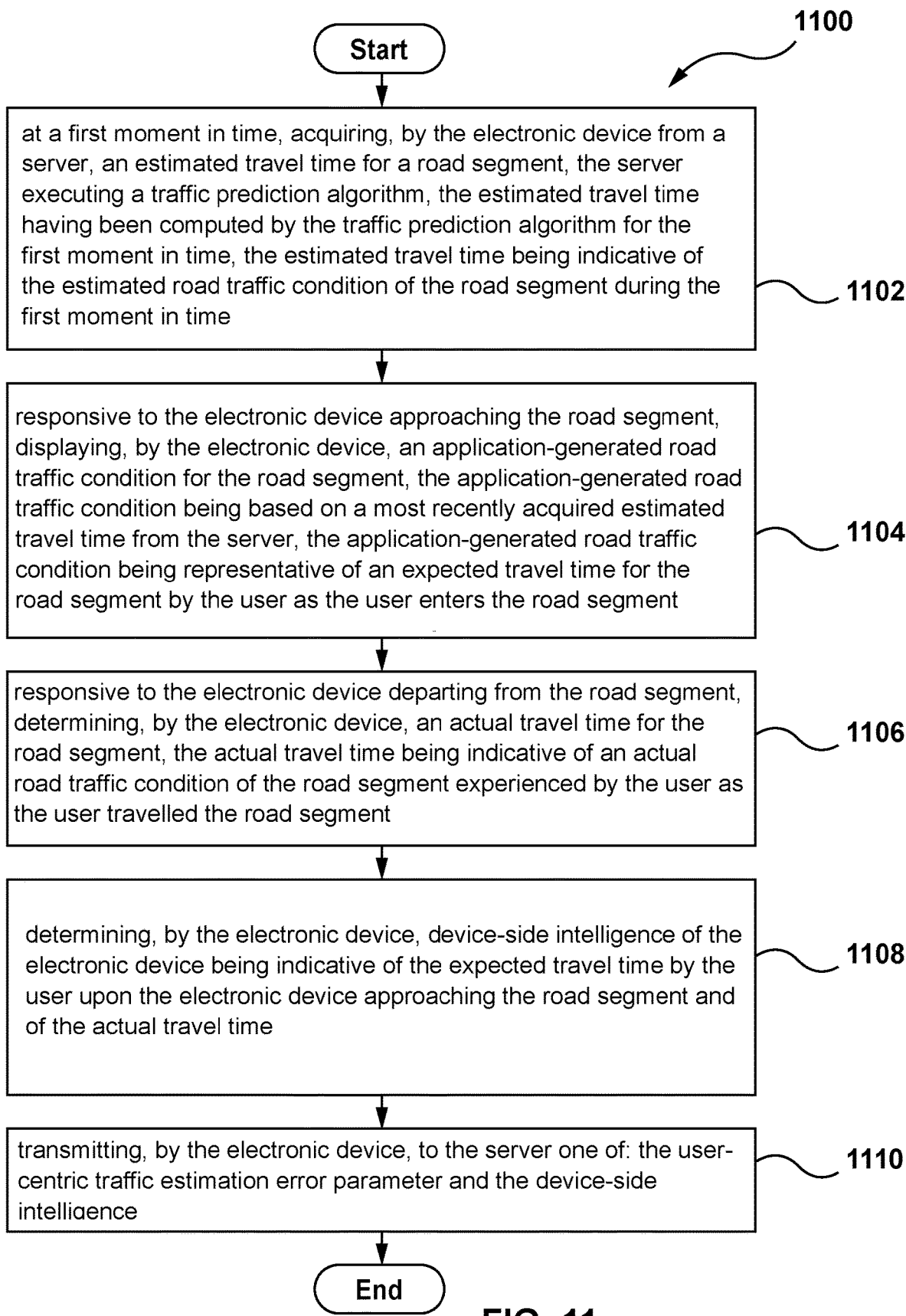
FIG. 11 is a block-scheme representation of a method of determining a user-centric traffic estimation error parameter according to some implementations of the present technology.

As such, it is contemplated that after the third determination of the navigational information at 9:36 am (i.e., 3 minutes after that the second determination of the navigational information has been executed), the server 230 may be configured to generate and send a third response data packet 632 which comprises inter alia second updated navigational information 801 depicted in FIG. 8. The second updated navigational information 801 comprises a third updated route data 800 for the first route and a fourth updated route data 802 for the second route. The third updated route data 800 comprises an estimated travel time for the road segment A of 4 minutes (which was computed at 9:36 am) and for the road segment B of 9 minutes (which was computed at 9:36 am). Similarly, the fourth updated route data 802 comprises an estimated travel time for the road segment C of 6 minutes (which was computed at 9:36 am) and for the road segment D of 13 minutes (which was computed at 9:36 am).

It should be noted that at 9:36 am, the user already started travelling along the first route and more specifically, along the first road segment 413 (i.e., road segment A). However, the server 230 may still be configured to provide updated navigational information for the secondary route 420 (i.e., the second route) since, as previously explained, the communications network 240 may be experiencing technical difficulties and the server 230 may not be aware that the user already started travelling along the main route 410 and no longer requires navigational information for the secondary route 420. Nonetheless, in some embodiments of the present technology, the fourth updated route data 802 may be omitted from the second updated navigational information 801.

It may so happen that although the server 230 generated and sent the third response data packet 632, for some reason, the third response data packet 632 was not transmitted all the way to or otherwise not acquired by the electronic device 210. This non-acquisition of the third response data packet 632 by the electronic device 210 may have been caused by a plethora of issues mentioned above. Irrespective of a specific reason why the third response data packet 632 has not been acquired by the electronic device 210, suffice it to state that the third response data packet 632 has not been acquired by the electronic device 210.

As a result, from the second moment in time being 9:35 am until at least the third moment in time being 9:38 am, at which the user departs from the first road segment 413, the electronic device 210 will display the application-generated version of the navigational information 501 acquired via the response data packet 282, since it was the most recently acquired navigational information by the electronic device 210. Even though the server 230 sent the second response data packet 622 and the third response data packet 632 with "updated" navigational information (i.e., the first and the second updated navigational information 701 and 801, respectively), the user is provided at 9:35 am with the application-generated version of the "outdated" navigational information (i.e., the navigational information 501) for the first route and is provided with that application-generated version of the "outdated" navigational information for the entire time she is travelling along the first road segment 413.

As previously mentioned, while the user is travelling along the first route, the electronic device 210 displays the application-generated version of the navigational information 501 and, as a result, the user expects that it will take her 2 minutes in order to pass the first road segment 413, such as indicated by the first indicator 450. While viewing the GUI 403, the user is not aware that the application-generated road traffic condition provided via the first indicator 450 is based on "outdated" navigational information (i.e., the navigational information 501).

It is assumed again that it takes the user 3 minutes to pass the first road segment 413. In other words, it is assumed that the actual travel time for the user for arriving from the point 411 to the point 414 is 3 minutes. Since the user is provided with the application-generated road traffic condition displayed via the first indicator 450, which did not provide an indication of 3 minutes, the user may assume that the estimated travel time determined by the traffic prediction algorithm, based on which the application-generated road traffic condition was generated, was erroneous.

Without wishing to be bound to any specific theory, in at least some embodiments of the present technology, it is contemplated that the user may be dissatisfied with the most recently acquired estimated travel time that is being provided thereto, since the most recently acquired estimated travel time may be outdated.

This user-centric dissatisfaction associated with the GUI 403 may be undetectable from the point of view of the server 230. At the third moment in time, when the electronic device 210 departs from the first road segment 413 (i.e., passes the point 414), or as soon as the network issues are resolved, the server 230 may receive the indication of the actual travel time which is 3 minutes and determines that it is 1 minute less than the "updated" estimated travel time for the road segment A of the second updated navigational information 801. In other words, since the server 230 is not "aware" that the third response data packet 632 was not transmitted all the way to or otherwise not acquired by the electronic device 210, the server 230 is not "aware" that the application-generated road traffic condition that is provided to the user is based on the "outdated" navigational information 501 and is actually 1 minute less than the actual travel time.

Put another way, in the scenario 2, the server 230 determines that server-centric dissatisfaction is associated with 1 minute of overestimation, but is not "aware" that the user-centric dissatisfaction associated with the GUI 403 is actually associated with 1 minute of underestimation. With reference to FIG. 10, there is depicted a device-side intelligence 1000 and a server-side intelligence 1002 according to the scenario 2. The device-side intelligence 1000 is determined by the electronic device 210 and is indicative of the fact that the user was provided with the application-generated version of the navigational information 501 (i.e., "outdated" navigational information) and, therefore, is dissatisfied because the application-generated road traffic condition provided to the user for the first road segment 413 underestimated the actual road traffic for the first road segment 413. On the other hand, the server-side intelligence 1002 is determined by the server 230 and is indicative of the fact that the server 230 is not aware that the third response data packet 632 was not acquired by the electronic device 210 and, therefore, determines that the user should be dissatisfied with an overestimation of the actual road traffic condition.

Therefore, in at least some embodiments of the present technology, providing an indication of the user-centric dissatisfaction associated with the GUI 403 from the electronic device 210 to the server 230 may be desired since this user-centric dissatisfaction associated with the GUI 403 may be undetectable by the server 230. In at least some embodiments of the present technology, adjusting the traffic prediction algorithm based on the indication of the user-centric dissatisfaction associated with the GUI 403 provided by the electronic device 210 may be desired since the server-centric dissatisfaction determined by the server 230 may be different from the user-centric dissatisfaction associated with the GUI 403. The adjustment of the traffic prediction algorithm may allow reducing future user-centric dissatisfaction associated with GUIs.

To that end, in some embodiment of the present technology, the electronic device 210 may be configured to compute the user-centric traffic prediction error parameter based on the device-side intelligence 1000. This user-centric traffic prediction error parameter is computed based on the application-generated road traffic condition for a given road segment and the actual travel time for the given road segment.

In this case, the user-centric traffic prediction error parameter is a difference between 2 minutes (i.e., expected travel time represented by the application-generated road traffic condition at 9:30 am for the first road segment 413) and 3 minutes (i.e., the actual travel time that the user required for passing the first road segment 413). The user-centric traffic prediction error parameter is also indicative of a difference between the estimated road traffic conditions assessed by the server for 9:30 am for the first road segment 413 and the actual road traffic conditions experienced by the user after passing the first road segment 413.

The electronic device 210 may be configured to generate the error data packet 284 comprising information representative of the user-centric traffic prediction error parameter. The electronic device 210 may then send the error data packet 284 to the server 230 via the communications network 240 as soon as possible (i.e., when the issues with communications network 240 are resolved).

Alternatively, the error data packet 284 may comprise the information representative of the device-side intelligence 1000 so that the user-centric traffic prediction error parameter can be computed at the server 230 based on the device-side intelligence 1000. Moreover, the server 230 may be configured to compare the device-side intelligence 1000 and the server-side intelligence 1002. If the server 230 determines that the server-side intelligence 1002 is different from the device-side intelligence, the server 230 may determine that at least one data packet comprising "updated" navigational information was not transmitted all the way to or otherwise not transmitted to the electronic device 210.

In some embodiments of the present technology, there is provided a method 1100 of determining the user-centric traffic estimation error parameter associated with an estimated road traffic condition that is electronically provided to the user of the electronic device 210. The method 1100 will now be described.

Step 1102: Acquiring an Estimated Travel Time for a Given Road Segment at the First Moment in Time The method 1100 begins at step 1110 with the electronic device 210 acquiring from the server 230, at the first moment in time, a given estimated travel time for a given road segment. The server 230 implements the traffic prediction algorithm which computed the given estimated travel time for the first moment in time. This given estimated travel time is indicative of a given estimated road traffic condition of the given road segment during the first moment in time.

In some embodiments, in order to compute the given estimated travel time, the traffic prediction algorithm may require the initial navigational parameters. The initial navigational parameters may comprise data associated with a Point A, which is a starting position of the electronic device 210, and data associated with a Point B, which is a destination position of the electronic device 210. The initial navigational parameters may also comprise the indication of a given period of the day for which the navigational information is requested by the electronic device 210. Alternatively, the initial navigational parameters comprise the additional navigational parameters corresponding to the user-specific navigational preferences. Information representative of the initial navigational parameters may be provided by the electronic device 210 to the server 230 via the initial request data packet 280.

With reference to FIGS. 2 and 5, the electronic device 210 acquires the response data packet 282. The response data packet 282 comprises the navigational information 501 which was computed at the first moment in time being 9:30 am. The navigational information 501 is indicative of estimated road traffic conditions at 9:30 am for the road segments A, B, C and D. For example, the navigational information 501 comprises a given estimated travel time for each one of the road segments A, B, C and D. These estimated travel times are indicative of respective estimated road traffic conditions for a respective road segment at 9:30 am.

In some embodiments of the present technology, the traffic prediction algorithm periodically computes updated estimated travel times according to the frequency of computation. For example, the traffic prediction algorithm may be configured to "update" the navigational information every 3 minutes. Therefore, in this example, the frequency of computation is 3 minutes. In some implementations, this frequency of computation may vary dependently on the period of the day. For example, less updating of the navigational information is required during late evenings in comparison with rush hours. Therefore, the frequency of computation may be low during late evenings and high during rush hours.

Step 1104: Displaying the Application-Generated Road Traffic Condition for the Given Road Segment The method 1100 continues to step 1104 where, responsive to the electronic device 210 approaching the given road segment, the electronic device 210 displays the application-generated road traffic condition for the given road segment.

In some embodiments, the electronic device 210 may determine that it is approaching the given road segment. For example, the electronic device 210 may employ its GPS capabilities for determining whether or not it is approaching the road segment A.

With reference to FIG. 4, at the second moment in time corresponding to the moment in time when the electronic device 210 approaches the given road segment, the electronic device 210 may be configured to display the GUI 403 of the navigational application to the user. In this case, the GUI 403 comprises the first indicator 450 which is the application-generated road traffic condition for the second road segment 413 and is representative of the expected travel time by the user for the road segment 413.

It should be noted that if the interval of time between the first moment in time (i.e., when the electronic device 210 acquires the navigational information 501) and the second moment in time (i.e., when the electronic device 210 is approaching the given road segment) is superior to the frequency of computation, by the second moment in time an "updated" navigational information may be available at the server 230.

This "updated" navigational information may be sent by the server 230. With reference to FIG. 6, the second determination procedure indicator 620 is representative of the second determination of the navigational information by the traffic prediction algorithm. During the second determination of the navigational information, the traffic prediction algorithm determines the first updated navigational information 701 depicted in FIG. 7. The server 230 may be configured to generate and send the second response data packet 622 which comprises information representative of the first updated navigational information 701.

As previously explained, the second response data packet 622 is destined to be received by the electronic device 210 over the communications network 240 at 9:33 am. However, due to technical difficulties experienced by the communications network 240, at least at 9:33 am, the second response data packet 622 may not be transmitted all the way to or otherwise acquired by the electronic device 210.

At the second moment in time being 9:35 am, the application-generated road traffic condition is provided to the user and is based on the most recently acquired estimated travel time from the server 230 for the given segment. In such cases where the second response data packet 622 is not transmitted all the way to or otherwise acquired by the electronic device 210, the most recently acquired estimated travel time from the server 230 for the given segment is the estimated travel time for the given road segment that was acquired via the response data packet 282. It can therefore be said that, in some embodiments of the present technology, the most recently acquired estimated travel time may in fact be outdated estimated travel time at the second moment in time.

It should also be noted that the application-generated road traffic condition for the given road segment is representative of the expected travel time by the user for the given road segment as the user enters the given road segment. For example, since the first indicator 450 of the GUI 403 provides the user with an indication of 2 minutes, the user expects that the road traffic condition of the first road segment 413 is light in comparison with if the first indicator 450 provided the user with an indication of 10 minutes.

Step 1106: Determining the Actual Travel Time for the Given Road Segment

The method 1100 continues to step 1106 where, responsive to the electronic device 210 departing from the given road segment, the electronic device 210 determines the actual travel time for the given road segment. The actual travel time is indicative of the actual road traffic condition for the given road segment experienced by the user as the user travelled along the given road segment.

It should be noted that the electronic device 210 may determine that it is departing from the given road segment via its GPS capabilities similarly to how the electronic device 210 may have determined that it was approaching the given road segment. In this example, a determination of a departure of the electronic device 210 from the given road segment is represented in FIG. 6 via the departure indicator 616. Therefore, at 9:38 am, which is the third moment in time, the electronic device 210 determines that the actual travel time for the first road segment 413 is 3 minutes (i.e., the interval of time between the second moment in time and the third moment in time). The actual travel time of 3 minutes is therefore indicative of the actual road traffic condition for the first road segment 413 as experienced by the user as the user travelled along the first road segment 413.

With reference to FIG. 6, the actual travel time is the interval of time between the departure indicator 616 and the approach indicator 612. The indication of the actual travel time may be provided to the server 230 as soon as the network issues of the communications network 240 are resolved.

Step 1108: Determining Device-Side Intelligence of the Electronic Device

The method 1100 continues to step 1108 with the electronic device 210 being configured to determine the device-side intelligence 900. The device-side intelligence 900 is indicative of the expected travel time by the user upon the electronic device 210 approaching the first road segment 413 and of the actual travel time for the first road segment 413. The electronic device 210 may be configured to store the device-side intelligence 900 locally on the solid-state drive 120 of the electronic device 210.

Due to the fact that the server 230 is not aware that the second response data packet 622 was not transmitted all the way to or otherwise not acquired by the electronic device 210, and with reference to FIG. 9, the device-side intelligence 900 and the server-side intelligence 902 may be different.

The server-side intelligence 902 is indicative of the fact that, from the perspective of the server 230, the application-generated road traffic condition for the first road segment 413 that the user is provided with should have been based on "updated" navigational information (i.e., the first updated navigational information 701). Therefore, the server 230 stores 3 minutes as the expected travel time by the user for the first road segment 413, which is not the application-generated road traffic condition provided to the user (which is an erroneous assessment by the server 230).

On the other hand, device-side intelligence 900 is indicative of the fact that, from the perspective of the electronic device 210 and the user, the application-generated road traffic condition for the first road segment 413 that the user is provided with is based on the navigational information 501 acquired via the most recently acquired data packet from the server 230. Therefore, the electronic device 210 stores 2 minutes as the expected travel time by the user for the first road segment 413, which is the application-generated road traffic condition provided to the user (which is the correct assessment by the electronic device 210).

Step 1110: Transmitting One of the User-Centric Traffic Estimation Error Parameter and the Device-Side Intelligence The method 1100 ends at step 1110 with the electronic device 210 being configured to transmit to the server 230 for adjusting the traffic prediction algorithm based on the user-centric traffic estimation error parameter, one of: the user-centric traffic estimation error parameter and the device-side intelligence 900. The electronic device 210 may be configured to compute the user-centric traffic estimation error parameter based on the device-side intelligence 900 in the case where the electronic device 210 transmits the user-centric traffic estimation error parameter. However, in the case where the electronic device 210 transmits the device-side intelligence 900, the server 230 may be configured to compute the the user-centric traffic estimation error parameter based on the device-side intelligence 900 received from the electronic device 210.

Indeed, irrespective of whether it is the electronic device 210 or the server 230 that computes the user-centric estimation error parameter, the user-centric traffic estimation error parameter can be computed based on the device-side intelligence 900. In this scenario, the user-centric traffic estimation error parameter is the difference between 2 minutes (the expected travel time by the user for the first road segment which is represented by the application-generated road traffic condition for the first road segment 413 provided to the user at 9:35 am) and 3 minutes (the actual travel time that it took the user for passing the first road segment 413). Therefore, the user-centric traffic estimation error parameter is indicative of a difference between the application-generated road traffic condition provided to the user upon the electronic device 210 approaching the given road segment and the actual road traffic condition experienced by the user as the user travelled along the first road segment 413.

In order to transmit either the device-side intelligence 900 or the user-centric traffic prediction error parameter, the electronic device 210 may be configured to generate the error data packet 284 comprising information representative of either the device-side intelligence 900 or the user-centric traffic prediction error parameter. The electronic device 210 may then send the error data packet 284 to the server 230 via the communications network 240 as soon as the issues with communications network 240 are resolved.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of determining a user-centric traffic estimation error parameter associated with an estimated road traffic condition that is electronically provided to a user of an electronic device using a navigational application executed on the electronic device, the user travelling with the electronic device in a vehicle, the electronic device being communicatively coupled to a server by a communication network, the method being executed on the electronic device, the method comprising:
at a first moment in time,
acquiring, by the electronic device from the server over the communication network, an estimated travel time for a road segment,
the estimated travel time being associated with the first moment in time, the estimated travel time having been predicted by a traffic prediction algorithm by the server based on the estimated road traffic condition of the road segment during the first moment in time;
at a second moment in time being later in time than the first moment in time, responsive to the electronic device approaching the road segment,
displaying, by the electronic device, an application-generated road traffic condition for the road segment,
the application-generated road traffic condition being based on the estimated travel time of the first moment in time acquired over the communication network from the server,
an updated estimated travel time at the second moment in time being non-acquired by the electronic device over the communication network,
the estimated travel time being an outdated estimated travel time at the second moment in time,
the application-generated road traffic condition being representative of an expected travel time for the road segment by the user as the user enters the road segment;
responsive to the electronic device departing from the road segment,
determining, by the electronic device, an actual travel time for the road segment by using GPS data and temporal data associated with the electronic device,
the actual travel time being indicative of an actual road traffic condition of the road segment experienced by the user as the user travelled the road segment;
transmitting, by the electronic device over the communication network, to the server an indication of the user-centric traffic estimation error parameter,
the user-centric traffic estimation error parameter being a difference between the estimated travel time of the first moment in time and the actual travel time; and
using, by the server, the user-centric traffic estimation error parameter for updating the traffic prediction algorithm.

2. The method of claim 1, wherein the method further comprises determining, by the electronic device, that the electronic device is approaching the road segment.

3. The method of claim 1, wherein the server is configured to acquire updated estimated travel times according to a frequency of computation.

4. The method of claim 3, wherein the frequency of computation varies depending on a period of a day.

5. The method of claim 3, wherein a most recently acquired estimated travel time from the server is the estimated travel time of the first moment in time.

6. The method of claim 1, wherein the electronic device departs from the road segment at a third moment in time, the third moment in time being later in time than the second moment in time, and wherein a most recently acquired estimated travel time is an outdated estimated travel time at the third moment in time.

7. The method of claim 1, wherein the method further comprises determining, by the electronic device, that the electronic device is departing from the road segment.

8. A server for determining a user-centric traffic estimation error parameter associated with an estimated road traffic condition, the server being communicatively coupled to an electronic device by a communication network, the electronic device executing a navigational application for electronically providing to a user of the electronic device the estimated road traffic condition, the user travelling with the electronic device in a vehicle, the server being configured to:
  acquire, from the electronic device over the communication network, initial navigational parameters being indicative of a request from the user for the estimated road traffic condition,
  at a first moment in time:
    acquire an estimated travel time for a road segment for the first moment in time based on the initial navigational parameters, the estimated travel time being based on the estimated road traffic condition of the road segment during the first moment in time calculated by a traffic prediction algorithm by the server;
    transmit over the communication network the estimated travel time for the road segment for the first moment in time to the navigational application of the electronic device;
  acquire an updated estimated travel time for the road segment for another moment in time, the another moment in time being later in time than the first moment in time, the updated estimated travel time being indicative of an updated estimated road traffic condition of the road segment during the another moment in time;
  transmit over the communication network the updated estimated travel time for the road segment for the another moment in time to the navigational application of the electronic device,
    the updated estimated travel time for the road segment for the another moment in time being non-acquired by the electronic device,
    the server being unaware of non-acquisition by the electronic device over the communication network of the updated estimated travel time for the road segment for the another moment in time; and
  at a third moment in time, the third moment in time being later in time than the another moment in time:
    acquire over the communication network an indication of the user-centric traffic estimation error parameter,
      the user-centric traffic estimation error parameter being a difference between the estimated travel time of the first moment in time and an actual travel time,
      the estimated travel time being an outdated estimated travel time at the another moment in time,
      the estimated travel time used by the electronic device for displaying an application-generated road traffic condition to the user,
      the application-generated road traffic condition being representative of an expected travel time for the road segment by the user as the user enters the road segment,
      the actual travel time being indicative of an actual road traffic condition for the road segment experienced by the user as the user travelled the road segment; and
  use the user-centric traffic estimation error parameter, by the server for updating the traffic prediction algorithm.

9. The server of claim 8, wherein the server is configured to acquire updated estimated travel times according to a frequency of computation.

10. The server of claim 9, wherein the frequency of computation varies depending on a period of a day.

* * * * *